United States Patent
Wang et al.

(10) Patent No.: US 12,409,849 B2
(45) Date of Patent: Sep. 9, 2025

(54) METHOD AND APPARATUS FOR PASSING THROUGH BARRIER GATE CROSSBAR BY VEHICLE

(71) Applicant: Shenzhen Yinwang Intelligent Technologies Co., Ltd., Guangdong (CN)

(72) Inventors: Yanyan Wang, Shenzhen (CN); Zuguang Wu, Hangzhou (CN); Yue Yang, Shanghai (CN); Jia Zheng, Hangzhou (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 17/975,392

(22) Filed: Oct. 27, 2022

(65) Prior Publication Data
US 2023/0048680 A1    Feb. 16, 2023

Related U.S. Application Data

(63) Continuation of application No. PCT/CN2020/087578, filed on Apr. 28, 2020.

(51) Int. Cl.
*B60W 60/00*  (2020.01)
*B60W 30/18*  (2012.01)

(52) U.S. Cl.
CPC ..... *B60W 60/001* (2020.02); *B60W 30/18009* (2013.01); *B60W 2420/403* (2013.01); *B60W 2552/50* (2020.02)

(58) Field of Classification Search
None
See application file for complete search history.

(56) References Cited

U.S. PATENT DOCUMENTS

| | | | |
|---|---|---|---|
| 6,212,825 B1 * | 4/2001 | Hopkins, Jr. | E01F 13/06 49/358 |
| 2002/0090259 A1 * | 7/2002 | Crowley | E01F 15/003 404/6 |

(Continued)

FOREIGN PATENT DOCUMENTS

| CN | 103359034 A | 10/2013 |
|---|---|---|
| CN | 208421926 U | 1/2019 |

(Continued)

OTHER PUBLICATIONS

Machine translation of DE102013226599A1, a FOR document provided in the IDS (Year: 2024).*

*Primary Examiner* — Aniss Chad
*Assistant Examiner* — Jennifer M Anda
(74) *Attorney, Agent, or Firm* — WOMBLE BOND DICKINSON (US) LLP

(57) ABSTRACT

A vehicle collects data of a plurality of to-be-detected barrier gate crossbars around the vehicle by using a sensor mounted on the vehicle, and transmits the data of the plurality of to-be-detected barrier gate crossbars to a processor; the processor determines data of a target barrier gate crossbar from the data of the plurality of to-be-detected barrier gate crossbars based on a pose of the target barrier gate crossbar, where the target barrier gate crossbar is a barrier gate crossbar of a lane on which the vehicle is located; and the processor determines a status of the target barrier gate crossbar based on the data of the target barrier gate crossbar, and controls, based on the status of the target barrier gate crossbar, the autonomous driving vehicle to pass through the target barrier gate crossbar.

20 Claims, 25 Drawing Sheets

(56) References Cited

U.S. PATENT DOCUMENTS

| | | | |
|---|---|---|---|
| 2006/0228177 A1 | 10/2006 | Allain et al. | |
| 2013/0261950 A1* | 10/2013 | Sasabuchi | B61L 23/041 342/70 |
| 2019/0111919 A1* | 4/2019 | Matsunaga | B60W 10/18 |
| 2019/0347496 A1* | 11/2019 | Takahashi | G01B 11/24 |
| 2020/0062243 A1 | 2/2020 | Perez Barrera et al. | |
| 2020/0070823 A1 | 3/2020 | Zhang et al. | |
| 2022/0324480 A1* | 10/2022 | Tsunekazu | B60W 60/001 |

FOREIGN PATENT DOCUMENTS

| | | |
|---|---|---|
| CN | 109345647 A | 2/2019 |
| CN | 109664878 A | 4/2019 |
| CN | 109774714 A | 5/2019 |
| CN | 110503823 A | 11/2019 |
| DE | 102013226599 A1 | 6/2015 |
| DE | 102015209671 A1 | 12/2016 |
| EP | 2645126 A1 | 10/2013 |
| JP | 2014137611 A | 7/2014 |
| KR | 19980073039 A | 11/1998 |

\* cited by examiner

METHOD AND APPARATUS FOR PASSING THROUGH BARRIER GATE CROSSBAR BY VEHICLE

CROSS-REFERENCE TO RELATED APPLICATIONS

This application is a continuation of International Application No. PCT/CN2020/087578, filed on Apr. 28, 2020, which is hereby incorporated by reference in its entirety.

TECHNICAL FIELD

Embodiments of this application relate to the field of autonomous driving, furthermore, to a method and an apparatus for passing through a barrier gate crossbar by a vehicle.

BACKGROUND

Artificial intelligence (AI) is a theory, method, technology, and application system that simulates, extends, and expands human intelligence, perceives an environment, obtains knowledge, and uses the knowledge to obtain an optimal result by using a digital computer or a digital computer-controlled machine. In other words, artificial intelligence is a branch of computer science, and seeks to learn essence of intelligence and produce a new intelligent machine that can react in a way similar to artificial intelligence. Artificial intelligence is to study design principles and implementation methods of various intelligent machines, so that the machines have functions of perception, inference, and decision-making. Researches in the field of artificial intelligence include robotics, natural language processing, computer vision, decision-making and inference, human-computer interaction, recommendation and search, basic theories of AI, and the like.

Autonomous driving is a mainstream application in the field of artificial intelligence. An autonomous driving technology relies on collaboration of computer vision, a radar, a monitoring apparatus, a global positioning system, and the like, to enable a motor vehicle to implement autonomous driving without active human operations. An autonomous driving vehicle uses various computing systems to help transport a passenger from one position to another position. Some autonomous driving vehicles may require some initial inputs or continuous inputs from an operator (such as a navigator, a driver, or a passenger). The autonomous driving vehicle allows the operator to switch from a manual operation mode to an autonomous driving mode or a mode between the manual operation mode and the autonomous driving mode. Because the autonomous driving technology does not require a human to drive a motor vehicle, a driving error of a human can be effectively avoided theoretically, occurrence of traffic accidents can be reduced, and highway transportation efficiency can be improved. Therefore, the autonomous driving technology has received increasing attention.

However, there is no definite solution for how an autonomous driving vehicle passes through a barrier gate crossbar.

SUMMARY

This application provides a method and an apparatus for passing through a barrier gate crossbar by a vehicle, and resolves a problem of how a vehicle passes through a barrier gate crossbar in an autonomous driving mode.

To achieve the foregoing objective, this application uses the following technical solutions.

According to a first aspect, this application provides a method for passing through a barrier gate crossbar by a vehicle. The method may be applied to a processor. For example, the processor includes a chip system. The method includes: The processor obtains data that is of N to-be-detected barrier gate crossbars around a vehicle and that is collected by one or more sensors mounted on the vehicle, and the processor determines data of a target barrier gate crossbar from the data of the N to-be-detected barrier gate crossbars based on a pose of the target barrier gate crossbar, where the target barrier gate crossbar is a barrier gate crossbar of a lane on which the vehicle is located. Further, the processor determines a status of the target barrier gate crossbar based on the data of the target barrier gate crossbar, and controls, based on the status of the target barrier gate crossbar, the vehicle to pass through the target barrier gate crossbar. N is an integer greater than or equal to 1.

In an autonomous driving mode, the vehicle may travel based on a road map. The road map may be a high-precision map, and records information about a static object around a lane. For example, the road map records information about a preplanned barrier gate crossbar in a lane. Therefore, in a traveling process, the vehicle may obtain the pose of the barrier gate crossbar of the lane on which the vehicle is located based on the road map. It may be understood that, the barrier gate crossbar of the lane on which the vehicle is located is the target barrier gate crossbar. The target barrier gate crossbar is a barrier gate crossbar that the vehicle is to pass through. The pose includes a position and an orientation. However, the vehicle does not know a state of the barrier gate crossbar that the vehicle is to pass through.

Further, the vehicle senses the N to-be-detected barrier gate crossbars in a surrounding environment of the vehicle by using the one or more sensors, to obtain the data of the N to-be-detected barrier gate crossbars. However, the vehicle does not know data of which barrier gate crossbar in the data of the N to-be-detected barrier gate crossbars is the data of the barrier gate crossbar of the lane on which the vehicle is located. Therefore, the vehicle determines the data of the target barrier gate crossbar from the data of the N to-be-detected barrier gate crossbars. In this way, the status of the target barrier gate crossbar is determined based on the data of the target barrier gate crossbar, and the vehicle is controlled to pass through the target barrier gate crossbar.

In one embodiment, the status of the target barrier gate crossbar includes an open/close state, and the open/close state of the target barrier gate crossbar includes open and close. The controlling, based on the status of the target barrier gate crossbar, the vehicle to pass through the target barrier gate crossbar includes: controlling, based on the open/close state of the target barrier gate crossbar, the vehicle to pass through the target barrier gate crossbar.

For example, when the open/close state of the target barrier gate crossbar is open, the vehicle is controlled to travel, to smoothly pass through the target barrier gate crossbar.

In another example, when the open/close state of the target barrier gate crossbar is close, the vehicle is controlled to stop, to avoid running into the target barrier gate crossbar.

In another possible design, the status of the target barrier gate crossbar further includes a motion state, and the motion state of the target barrier gate crossbar includes ascending, descending, and static. The controlling, based on the status of the target barrier gate crossbar, the vehicle to pass through the target barrier gate crossbar includes: controlling, based on the open/close state and the motion state of the target barrier gate crossbar, the vehicle to pass through the target barrier gate crossbar.

Vehicle traveling states in various possible cases of the open/close state and the motion state of the target barrier gate crossbar are described below.

In a first case, when the open/close state of the target barrier gate crossbar is open, and the motion state of the target barrier gate crossbar is ascending, the vehicle is controlled to travel.

In a second case, when the open/close state of the target barrier gate crossbar is open, and the motion state of the target barrier gate crossbar is static, the vehicle is controlled to travel.

In a third case, when the open/close state of the target barrier gate crossbar is open, and the motion state of the target barrier gate crossbar is descending, the vehicle is controlled to stop.

In a fourth case, when the open/close state of the target barrier gate crossbar is close, and the motion state of the target barrier gate crossbar is descending, the vehicle is controlled to stop.

In a fifth case, when the open/close state of the target barrier gate crossbar is close, and the motion state of the target barrier gate crossbar is static, the vehicle is controlled to stop.

In a sixth case, when the open/close state of the target barrier gate crossbar is close, and the motion state of the target barrier gate crossbar is ascending, the vehicle is controlled to stop.

In one embodiment, the determining an open/close state and a motion state of the target barrier gate crossbar based on the data of the target barrier gate crossbar includes: determining an angle of the target barrier gate crossbar based on the data of the target barrier gate crossbar, where the angle of the target barrier gate crossbar is an included angle between the target barrier gate crossbar and a reference straight line; and determining the open/close state and the motion state of the target barrier gate crossbar based on the angle of the target barrier gate crossbar.

In some embodiments, determining the open/close state of the target barrier gate crossbar based on the angle of the target barrier gate crossbar includes: if the angle of the target barrier gate crossbar is greater than a first preset angle, determining that the open/close state of the target barrier gate crossbar is open; if the angle of the target barrier gate crossbar is less than a second preset angle, determining that the open/close state of the target barrier gate crossbar is close, where the second preset angle is less than the first preset angle; and if the angle of the target barrier gate crossbar is less than or equal to the first preset angle, and the angle of the target barrier gate crossbar is greater than or equal to the second preset angle, determining that the open/close state of the target barrier gate crossbar is an open/close state that is of the target barrier gate crossbar and that is determined at a previous moment.

In some embodiments, determining the motion state of the target barrier gate crossbar based on the angle of the target barrier gate crossbar includes: if an $i^{th}$ angle of the target barrier gate crossbar is greater than an $(i-1)^{th}$ angle of the target barrier gate crossbar, determining that the motion state of the target barrier gate crossbar is ascending; and if the $i^{th}$ angle of the target barrier gate crossbar is less than the $(i-1)^{th}$ angle of the target barrier gate crossbar, determining that the motion state of the target barrier gate crossbar is descending, where the $i^{th}$ angle of the target barrier gate crossbar is determined based on the target barrier gate crossbar in an $i^{th}$ frame of image, the $(i-1)^{th}$ angle of the target barrier gate crossbar is determined based on the target barrier gate crossbar in an $(i-1)^{th}$ frame of image, and the $i^{th}$ frame of image is adjacent to the $(i-1)^{th}$ frame of image.

In another embodiment, the method further includes: obtaining the pose of the target barrier gate crossbar based on a pre-configured road map by using the processor.

In another embodiment, determining the target barrier gate crossbar included in the N to-be-detected barrier gate crossbars based on the data of the N to-be-detected barrier gate crossbars and the pose of the target barrier gate crossbar includes: determining first coordinates of the N to-be-detected barrier gate crossbars based on the data of the N to-be-detected barrier gate crossbars; determining coordinates of the target barrier gate crossbar based on the pose of the target barrier gate crossbar, where the first coordinates of the N to-be-detected barrier gate crossbars and the coordinates of the target barrier gate crossbar are coordinates in a two-dimensional coordinate system, or the first coordinates of the N to-be-detected barrier gate crossbars and the coordinates of the target barrier gate crossbar are coordinates in a three-dimensional coordinate system; determining N Euclidean distances based on the first coordinates of the N to-be-detected barrier gate crossbars and the coordinates of the target barrier gate crossbar; and determining data of a barrier gate crossbar corresponding to a smallest Euclidean distance in the N Euclidean distances as the data of the target barrier gate crossbar.

For different sensors, types of obtained data of barrier gate crossbars may be different. For example, a sensor may be a camera or a LiDAR.

In one embodiment, the first coordinates of the N to-be-detected barrier gate crossbars are the coordinates in the two-dimensional coordinate system, and the determining first coordinates of the N to-be-detected barrier gate crossbars based on the data of the N to-be-detected barrier gate crossbars includes: determining the first coordinates of the N to-be-detected barrier gate crossbars based on the data of the N to-be-detected barrier gate crossbars and a target position detection model.

In some embodiments, the coordinates of the target barrier gate crossbar are the coordinates in the two-dimensional coordinate system, and the determining coordinates of the target barrier gate crossbar based on the pose of the target barrier gate crossbar includes: determining a pose of the sensor based on a pose of the vehicle and an extrinsic parameter of the sensor; and determining the coordinates of the target barrier gate crossbar based on the pose of the target barrier gate crossbar, the pose of the sensor, and an intrinsic parameter of the sensor.

In some embodiments, the method further includes: training sample data to generate the target position detection model.

In another embodiment, the first coordinates of the N to-be-detected barrier gate crossbars are the coordinates in the three-dimensional coordinate system, and the determining first coordinates of the N to-be-detected barrier gate crossbars based on the data of the N to-be-detected barrier gate crossbars includes: determining three-dimensional models of the N to-be-detected barrier gate crossbars based on point cloud data of the N to-be-detected barrier gate crossbars, and determining the first coordinates of the N to-be-detected barrier gate crossbars based on the three-dimensional models of the N to-be-detected barrier gate crossbars.

According to a second aspect, this application provides an apparatus for passing through a barrier gate crossbar by a vehicle. The apparatus includes: a processing unit, configured to obtain data that is of N to-be-detected barrier gate crossbars and that is collected by one or more sensors, where N is an integer greater than or equal to 1, the processing unit is further configured to determine data of a target barrier gate crossbar from the data of the N to-be-detected barrier gate crossbars based on a pose of the target barrier gate crossbar, the target barrier gate crossbar is a barrier gate crossbar of a lane on which the vehicle is located, and the processing unit is further configured to determine a status of the target barrier gate crossbar based on the data of the target barrier gate crossbar; and a control unit, configured to control, based on the status of the target barrier gate crossbar, the vehicle to pass through the target barrier gate crossbar.

In one embodiment, the status of the target barrier gate crossbar includes an open/close state, and the open/close state of the target barrier gate crossbar includes an open state and a close state. The control unit is configured to control, based on the open/close state of the target barrier gate crossbar, the vehicle to pass through the target barrier gate crossbar.

For example, when the open/close state of the target barrier gate crossbar is open, the vehicle is controlled to travel, to smoothly pass through the target barrier gate crossbar.

In another example, when the open/close state of the target barrier gate crossbar is close, the vehicle is controlled to stop, to avoid running into the target barrier gate crossbar.

In another embodiment, the status of the target barrier gate crossbar further includes a motion state, and the motion state of the target barrier gate crossbar includes ascending, descending, and static. The control unit is configured to control, based on the open/close state and the motion state of the target barrier gate crossbar, the vehicle to pass through the target barrier gate crossbar.

Vehicle traveling states in various possible cases of the open/close state and the motion state of the target barrier gate crossbar are described below.

In a first case, when the open/close state of the target barrier gate crossbar is open, and the motion state of the target barrier gate crossbar is ascending, the vehicle is controlled to travel.

In a second case, when the open/close state of the target barrier gate crossbar is open, and the motion state of the target barrier gate crossbar is static, the vehicle is controlled to travel.

In a third case, when the open/close state of the target barrier gate crossbar is open, and the motion state of the target barrier gate crossbar is descending, the vehicle is controlled to stop.

In a fourth case, when the open/close state of the target barrier gate crossbar is close, and the motion state of the target barrier gate crossbar is descending, the vehicle is controlled to stop.

In a fifth case, when the open/close state of the target barrier gate crossbar is close, and the motion state of the target barrier gate crossbar is static, the vehicle is controlled to stop.

In a sixth case, when the open/close state of the target barrier gate crossbar is close, and the motion state of the target barrier gate crossbar is ascending, the vehicle is controlled to stop.

In an embodiment, the processing unit is configured to: determine an angle of the target barrier gate crossbar based on the data of the target barrier gate crossbar, where the angle of the target barrier gate crossbar is an included angle between the target barrier gate crossbar and a reference straight line; and determine the open/close state and the motion state of the target barrier gate crossbar based on the angle of the target barrier gate crossbar.

In some embodiments, the processing unit is configured to: if the angle of the target barrier gate crossbar is greater than a first preset angle, determine that the open/close state of the target barrier gate crossbar is open; if the angle of the target barrier gate crossbar is less than a second preset angle, determine that the open/close state of the target barrier gate crossbar is close, where the second preset angle is less than the first preset angle; and if the angle of the target barrier gate crossbar is less than or equal to the first preset angle, and the angle of the target barrier gate crossbar is greater than or equal to the second preset angle, determine that the open/close state of the target barrier gate crossbar is an open/close state that is of the target barrier gate crossbar and that is determined at a previous moment.

In some embodiments, the processing unit is configured to: if an $i^{th}$ angle of the target barrier gate crossbar is greater than an $(i-1)^{th}$ angle of the target barrier gate crossbar, determine that the motion state of the target barrier gate crossbar is ascending; and if the $i^{th}$ angle of the target barrier gate crossbar is less than the $(i-1)^{th}$ angle of the target barrier gate crossbar, determine that the motion state of the target barrier gate crossbar is descending, where the $i^{th}$ angle of the target barrier gate crossbar is determined based on the target barrier gate crossbar in an $i^{th}$ frame of image, the $(i-1)^{th}$ angle of the target barrier gate crossbar is determined based on the target barrier gate crossbar in an $(i-1)^{th}$ frame of image, and the $i^{th}$ frame of image is adjacent to the $(i-1)^{th}$ frame of image.

In another embodiment, the processing unit is further configured to obtain the pose of the target barrier gate crossbar based on a pre-configured road map.

In another embodiment, the processing unit is configured to: determine first coordinates of the N to-be-detected barrier gate crossbars based on the data of the N to-be-detected barrier gate crossbars; determine coordinates of the target barrier gate crossbar based on the pose of the target barrier gate crossbar, where the first coordinates of the N to-be-detected barrier gate crossbars and the coordinates of the target barrier gate crossbar are coordinates in a two-dimensional coordinate system, or the first coordinates of the N to-be-detected barrier gate crossbars and the coordinates of the target barrier gate crossbar are coordinates in a three-dimensional coordinate system; determine N Euclidean distances based on the first coordinates of the N to-be-detected barrier gate crossbars and the coordinates of the target barrier gate crossbar; and determine data of a barrier gate crossbar corresponding to a smallest Euclidean distance in the N Euclidean distances as the data of the target barrier gate crossbar.

For different sensors, types of obtained data of barrier gate crossbars may be different. For example, a sensor may be a camera or a LiDAR.

In one embodiment, the first coordinates of the N to-be-detected barrier gate crossbars are the coordinates in the two-dimensional coordinate system, and the processing unit is configured to determine the first coordinates of the N to-be-detected barrier gate crossbars based on the data of the N to-be-detected barrier gate crossbars and a target position detection model.

In some embodiments, the coordinates of the target barrier gate crossbar are the coordinates in the two-dimensional coordinate system, and the processing unit is configured to: determine a pose of the sensor based on a pose of the vehicle and an extrinsic parameter of the sensor; and determine the coordinates of the target barrier gate crossbar based on the pose of the target barrier gate crossbar, the pose of the sensor, and an intrinsic parameter of the sensor.

In some embodiments, the processing unit is further configured to train sample data to generate the target position detection model.

In another embodiment, the first coordinates of the N to-be-detected barrier gate crossbars are the coordinates in the three-dimensional coordinate system, and the processing unit is configured to: determine three-dimensional models of the N to-be-detected barrier gate crossbars based on point cloud data of the N to-be-detected barrier gate crossbars, and determine the first coordinates of the N to-be-detected barrier gate crossbars based on the three-dimensional models of the N to-be-detected barrier gate crossbars.

According to a third aspect, an apparatus for passing through a barrier gate crossbar by a vehicle is provided. The apparatus includes a processor and a memory. The memory is configured to store computer programs and instructions. The processor receives data that is of N to-be-detected barrier gate crossbars and that is collected by one or more sensors. The processor is configured to execute the computer programs and instructions to implement the method for passing through a barrier gate crossbar by a vehicle according to the first aspect, where N is an integer greater than or equal to 1.

According to a fourth aspect, a computer program product is provided. The computer program product includes: computer program code, where when the computer program code is run, the method for passing through a barrier gate crossbar by a vehicle according to the first aspect is implemented.

According to a fifth aspect, this application provides a chip system. The chip system includes a processor, configured to implement functions of the processor in the method according to the first aspect. In one embodiment, the chip system further includes a memory, configured to store program instructions and/or data. The chip system may include a chip, or include a chip and other discrete devices.

According to a sixth aspect, this application provides a computer-readable storage medium. The computer-readable storage medium stores computer programs, where when the computer programs are run, the method for passing through a barrier gate crossbar by a vehicle according to the first aspect is implemented.

According to a seventh aspect, this application provides a vehicle, including one or more sensors and the apparatus for passing through a barrier gate crossbar by a vehicle according to the third aspect. The one or more sensors are configured to obtain data of a plurality of to-be-detected barrier gate crossbars. The apparatus is configured to implement the method for passing through a barrier gate crossbar by a vehicle according to the first aspect with auxiliary execution by the one or more sensors.

In this application, names of the apparatus for passing through a barrier gate crossbar by a vehicle, the vehicle, and the processor do not limit the devices themselves. During actual implementation, the devices may appear with other names. Provided that functions of the devices are similar to those of this application, the devices fall within the scope of the claims of this application and equivalent technologies thereof.

DESCRIPTION OF EMBODIMENTS

In the specification, claims, and accompanying drawings of this application, the terms "first", "second", "third" and the like are intended to distinguish between different objects but do not limit a particular order.

In addition, in the embodiments of this application, the word "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word "example" or "for example" or the like is intended to present a relative concept in a specific manner.

The following describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

For clear and concise description of the following embodiments, a brief description of related technologies is first provided.

Figure 1:
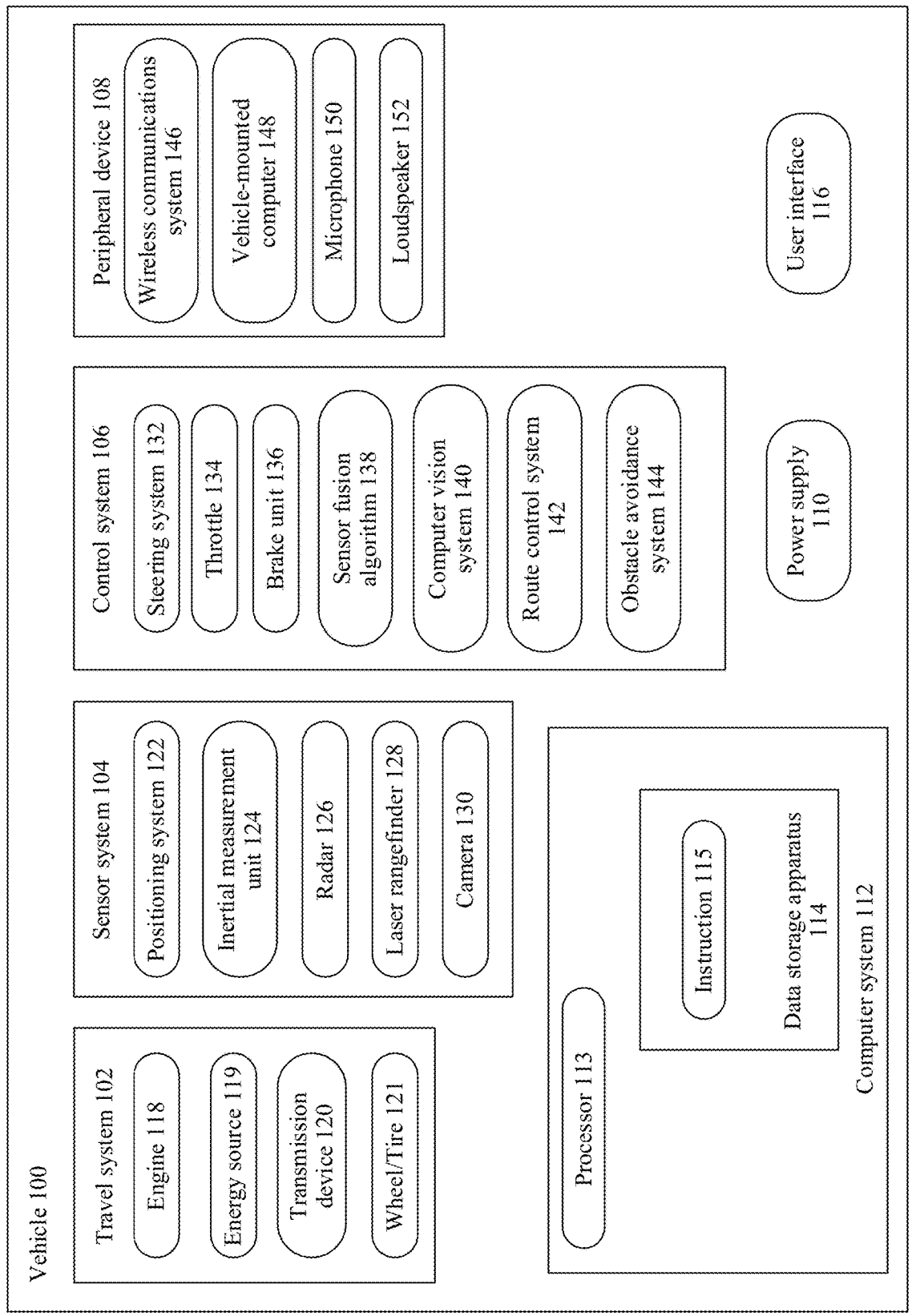
FIG. 1 is a schematic structural diagram of a vehicle according to an embodiment of this application.

FIG. 1 is a functional block diagram of a vehicle 100 according to an embodiment of this application. In an embodiment, the vehicle 100 is configured into a complete or partial autonomous driving mode. For example, the vehicle 100 may control itself in an autonomous driving mode, and through human operations, may determine current states of the vehicle and a surrounding environment of the vehicle, determine a possible behavior of at least one another vehicle in the surrounding environment, and determine a confidence level corresponding to a possibility that the another vehicle executes the possible behavior, and control the vehicle 100 based on determined information. When the vehicle 100 is in the autonomous driving mode, the vehicle 100 may be set to operate when there is no interaction with a human.

The vehicle 100 may include various subsystems, for example, a travel system 102, a sensor system 104, a control system 106, one or more peripheral devices 108 and a power supply 110, a computer system 112, and a user interface 116. In some embodiments, the vehicle 100 may include more or fewer subsystems, and each subsystem may include a plurality of elements. In addition, each subsystem and element of the vehicle 100 may be connected to each other in a wired or wireless manner.

The travel system 102 may include a component providing power motion to the vehicle 100. In an embodiment, the travel system 102 may include an engine 118, an energy source 119, a transmission device 120, and a wheel/tire 121. The engine 118 may be an internal combustion engine, an electric motor, an air compression engine, or a combination of other types of engines, such as a hybrid engine including a gasoline engine and an electric motor. Another example is a hybrid engine including an internal combustion engine and an air compression engine. The engine 118 converts the energy source 119 into mechanical energy.

Examples of the energy source 119 include gasoline, diesel, other petroleum-based fuels, propane, other compressed gas-based fuels, ethanol, a solar panel, a battery, and other power sources. The energy source 119 may also provide energy to other systems of the vehicle 100.

The transmission device 120 may transmit mechanical power from the engine 118 to the wheel/tire 121. The transmission device 120 may include a gear box, a differential, and a drive shaft. In an embodiment, the transmission device 120 may further include other devices, such as a clutch. For example, the drive shaft may include one or more shafts that may be coupled to one or more wheels/tires 121.

The sensor system 104 may include several sensors that sense information about a surrounding environment of the vehicle 100. For example, the sensor system 104 may include a positioning system 122 (the positioning system may be a global positioning system (GPS), or may be a Beidou system or another positioning system), an inertial measurement unit (IMU) 124, a radar 126, a laser rangefinder 128, and a camera 130. The sensor system 104 may also include sensors of internal systems of the monitored vehicle 100 (for example, an in-vehicle air quality monitor, a fuel gauge, and an oil temperature gauge). Sensor data from one or more of these sensors may be used for detecting an object and corresponding characteristics (a position, a shape, a direction, a speed, and the like) of the object. Such detection and recognition are key functions of safe operation of the vehicle 100.

The positioning system 122 may be configured to estimate a geographic location of the vehicle 100. The inertial measurement unit 124 is configured to sense a pose (a position and an orientation) change of the vehicle 100 based on an inertial acceleration. In an embodiment, the inertial measurement unit 124 may be a combination of an accelerometer and a gyroscope.

The radar 126 may sense an object in the surrounding environment of the vehicle 100 by using a radio signal. In some embodiments, in addition to sensing an object, the radar 126 may also be configured to sense a speed and/or an advancing direction of the object. For example, the radar 126 may be a LiDAR.

The laser rangefinder 128 may sense an object in an environment in which the vehicle 100 is located by using laser. In some embodiments, the laser rangefinder 128 may include one or more laser sources, a laser scanner, one or more detectors, and other system components.

The camera 130 may be configured to capture a plurality of images of the surrounding environment of the vehicle 100. The camera 130 may be a still camera or a video camera.

The control system 106 controls operations of the vehicle 100 and components of the vehicle 100. The control system 106 may include various elements, including a steering system 132, a throttle 134, a brake unit 136, a sensor fusion algorithm 138, a computer vision system 140, a route control system 142, and an obstacle avoidance system 144.

The steering system 132 is operable to adjust an advancing direction of the vehicle 100. For example, in an embodiment, the steering system 132 may be a steering wheel system.

The throttle 134 is configured to: control an operating speed of the engine 118 and further control a speed of the vehicle 100.

The brake unit 136 is configured to control the vehicle 100 to decelerate. The brake unit 136 may slow down the wheel/tire 121 by using a friction force. In other embodiments, the brake unit 136 may convert kinetic energy of the wheel/tire 121 into a current. The brake unit 136 may also slow down a rotation speed of the wheel/tire 121 by using other forms, to control the speed of the vehicle 100.

The computer vision system 140 is operable to process and analyze the images captured by the camera 130, to recognize objects and/or features in the surrounding environment of the vehicle 100. The objects and/or features may include traffic signals, road boundaries, and obstacles. The computer vision system 140 may use an object recognition algorithm, a structure from motion (Structure from Motion, SFM) algorithm, video tracking, and other computer vision technologies. In some embodiments, the computer vision system 140 may be configured to: map an environment, track an object, estimate a speed of the object, and the like.

The route control system 142 is configured to determine a travel route of the vehicle 100. In some embodiments, the route control system 142 may determine the travel route for the vehicle 100 with reference to data from the sensor fusion algorithm 138, the positioning system 122, and one or more predetermined maps.

The obstacle avoidance system 144 is configured to recognize, evaluate, and avoid or surmount, in other manners, potential obstacles in the environment of the vehicle 100.

Certainly, in an example, the control system 106 may additionally or alternatively include components other than those shown and described. Alternatively, some of the components shown above may be reduced.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information to the user of the vehicle 100. The user interface 116 may also operate the vehicle-mounted computer 148 to receive a user input. The vehicle-mounted computer 148 may be operated by using a touchscreen. In other cases, the peripheral device 108 may provide a means for the vehicle 100 to communicate with other devices located in the vehicle. For example, the microphone 150 may receive audio (for example, a voice command or another audio input) from the user of vehicle 100. Similarly, the speaker 152 may output audio to the user of the vehicle 100.

The wireless communications system 146 may wirelessly communicate with one or more devices directly or by using a communications network. For example, the wireless communications system 146 may use 3G cellular communication, such as code division multiple access (CDMA), EVDO, global system for mobile communications (GSM)/general packet radio service (GPRS), or 4G cellular communication, such as LTE, or 5G cellular communication. The wireless communications system 146 may communicate with a wireless local area network (WLAN) by using Wi-Fi. In some embodiments, the wireless communications system 146 may communicate directly with a device by using an infrared link, Bluetooth, or ZigBee. Other wireless protocols, such as various vehicle communications systems, for example, the wireless communication system 146 may include one or more dedicated short range communications (DSRC) devices, which may include public and/or private data communication between vehicles and/or roadside stations.

The power supply 110 may provide power to various components of the vehicle 100. In an embodiment, the power supply 110 may be a rechargeable lithium-ion or lead-acid battery. One or more battery packs of such batteries may be configured to provide power to various components of the vehicle 100. In some embodiments, the power supply 110 and the energy source 119 may be implemented together, such as in some all-electric vehicles.

Some or all of the functions of the vehicle 100 are controlled by the computer system 112. The computer system 112 may include at least one processor 113 that executes instructions 115 stored in a non-transitory computer-readable medium such as a data storage apparatus 114. The computer system 112 may alternatively be a plurality of computing devices that control individual components or subsystems of the vehicle 100 in a distributed manner. The data storage apparatus 114 may be a memory.

The processor 113 may be any conventional processor, such as a commercially available central processing unit (CPU). Alternatively, the processor may be a dedicated device such as an application-specific integrated circuit (ASIC) or another hardware-based processor. Although FIG. 1 functionally illustrates the processor, the memory, and other elements of the computer system 112 in a same block, a person of ordinary skill in the art should understand that the processor, the computer, or the memory may actually include a plurality of processors, computers, or memories that may not be stored in a same physical housing. For example, the memory may be a hard disk drive or another storage medium located in a housing different from that of the computer system 112. Therefore, reference to a processor or a computer will be understood as reference to a set including processors or computers or memories that may or may not operate in parallel. Different from using a single processor to perform the operations described herein, some components, such as a steering component and a deceleration component, may each have its own processor that performs only calculation related to component-specific functions.

In various aspects described herein, the processor may be located far away from the vehicle 100 and perform wireless communication with the vehicle 100. In other aspects, some of the processes described herein are performed by a processor disposed in the vehicle 100, and others are performed by a remote processor, including taking operations necessary for single manipulation.

In some embodiments, the data storage apparatus 114 may include instructions 115 (for example, program logics), and the instructions 115 may be executed by the processor 113, to perform various functions of the vehicle 100, including those described above. The data storage apparatus 114 may also include additional instructions, including instructions to send data to, receive data from, interact with, and/or control one or more of the travel system 102, the sensor system 104, the control system 106, and the peripheral device 108.

In addition to the instructions 115, the data storage apparatus 114 may also store data, such as a road map, route information, a position, a direction, and a speed of the vehicle, other such vehicle data, and other information. Such information may be used by the vehicle 100 and the computer system 112 during operation of the vehicle 100 in autonomous, semi-autonomous, and/or manual modes.

The user interface 116 is configured to provide information to or receive information from the user of the vehicle 100. In some embodiments, the user interface 116 may include one or more input/output devices in a set of peripheral devices 108, such as the wireless communications system 146, the vehicle-mounted computer 148, the microphone 150, and the speaker 152.

The computer system 112 may control the functions of the vehicle 100 based on inputs received from various subsystems (for example, the travel system 102, the sensor system 104, and the control system 106) and the user interface 116. For example, the computer system 112 may control, by using an input from the control system 106, the steering system 132 to avoid obstacles detected by the sensor system 104 and the obstacle avoidance system 144. In some embodiments, the computer system 112 is operable to provide control over many aspects of the vehicle 100 and the subsystems of the vehicle 100.

For example, when the vehicle 100 is in an autonomous driving mode, the processor 113 may obtain a road map from the data storage apparatus 114, and learn, based on the road map, a pose of a barrier gate crossbar of a lane on which the vehicle 100 is located. For ease of description, in the following, the barrier gate crossbar of the lane on which the vehicle 100 is located is referred to as a target barrier gate crossbar. The processor 113 may also receive data that is of a plurality of to-be-detected barrier gate crossbars in a surrounding environment and that is obtained by the sensor system 104, determine data of the target barrier gate crossbar from the data of the plurality of to-be-detected barrier gate crossbars in the surrounding environment based on a pose of the target barrier gate crossbar, and determine a status of the target barrier gate crossbar by using the data of the target barrier gate crossbar, and control, based on the status of the target barrier gate crossbar, the vehicle 100 to pass through the target barrier gate crossbar.

In this specification, the status of the target barrier gate crossbar includes an open/close state and a motion state. The open/close state includes open and close. It may be understood that, that the target barrier gate crossbar is in an open state may mean that an angle of the target barrier gate crossbar is greater than a particular angle. That the target barrier gate crossbar is in a close state may mean that the angle of the target barrier gate crossbar is less than a particular angle. In some embodiments, that the target barrier gate crossbar is in a close state may mean that the target barrier gate crossbar is completely closed. In other words, the target barrier gate crossbar is parallel to the ground.

The motion state is a state of a motion speed of an object relative to a reference system when the object performs mechanical motion. Content of the motion state includes the motion speed of the object (a variation of a position vector of the object per unit time, namely, displacement of the object per unit time) and a motion direction of the object. Static or motion also falls within a range of the motion state.

Physically, when the speed of the object changes and/or the motion direction of the object changes, the motion state of the object changes. Changes in the speed of the object include that the object changes from fast to slow, changes from slow to fast, changes from static to motion, and changes from motion to static. Changes in the motion direction of the object include upward rotation and downward rotation of the object.

In this specification, the motion state of the target barrier gate crossbar includes ascending, descending, and static.

In some embodiments, one or more of these components may be mounted separate from the vehicle 100 or may be associated with the vehicle 100. For example, the data storage apparatus 114 may exist partially or completely separate from the vehicle 100. The components may be communicatively coupled together in a wired and/or wireless manner.

In some embodiments, the foregoing components are merely an example. During actual application, components in the foregoing modules may be added or deleted based on an actual requirement. FIG. 1 should not be construed as a limitation on the embodiments of this application.

An autonomous driving automobile traveling on a road, such as the foregoing vehicle 100, may recognize an object in the surrounding environment of the vehicle 100, to determine adjustment on a current speed. The object may be another vehicle, a traffic control device, or another type of object. In some examples, each recognized object may be considered independently, and based on respective characteristics of the object, such as a current speed of the object, an acceleration of the object, a distance from the vehicle, a speed to be obtained after adjustment by the autonomous driving automobile may be determined.

In some embodiments, the vehicle 100 or a computing device (such as the computer system 112, the computer vision system 140, or the data storage apparatus 114 in FIG. 1) associated with the vehicle 100 may predict a behavior of the recognized object based on the characteristics of the recognized object and a state of the surrounding environment (such as traffic, rain, and ice on a road). In some embodiments, each recognized object depends on the behavior of each other. Therefore, the behavior of a single recognized object may alternatively be predicted by considering all the recognized objects together. The vehicle 100 can adjust the speed of the vehicle 100 based on the predicted behavior of the recognized object. In other words, the vehicle 100 can determine what steady state the vehicle 100 needs to adjust to (for example, accelerate, decelerate, or stop) based on the predicted behavior of the object. In this process, other factors such as a lateral position of the vehicle 100 on a road on which the vehicle 100 travels, a curvature of the road, and a proximity between static and dynamic objects may also be considered, to determine the speed of the vehicle 100.

In addition to providing instructions to adjust the speed of the vehicle 100, the computing device may also provide instructions to modify a steering angle of the vehicle 100, so that the vehicle 100 follows a given trajectory and/or maintains safe lateral and longitudinal distances from an object (such as a car in an adjacent lane on the road) near the vehicle 100.

The vehicle 100 may be a car, a truck, a motorcycle, a bus, a boat, an airplane, a helicopter, a lawn mower, a recreational vehicle, a playground vehicle, a construction device, a tram, a golf cart, a train, a cart, or the like. This is not particularly limited in the embodiments of this application.

Figure 2:
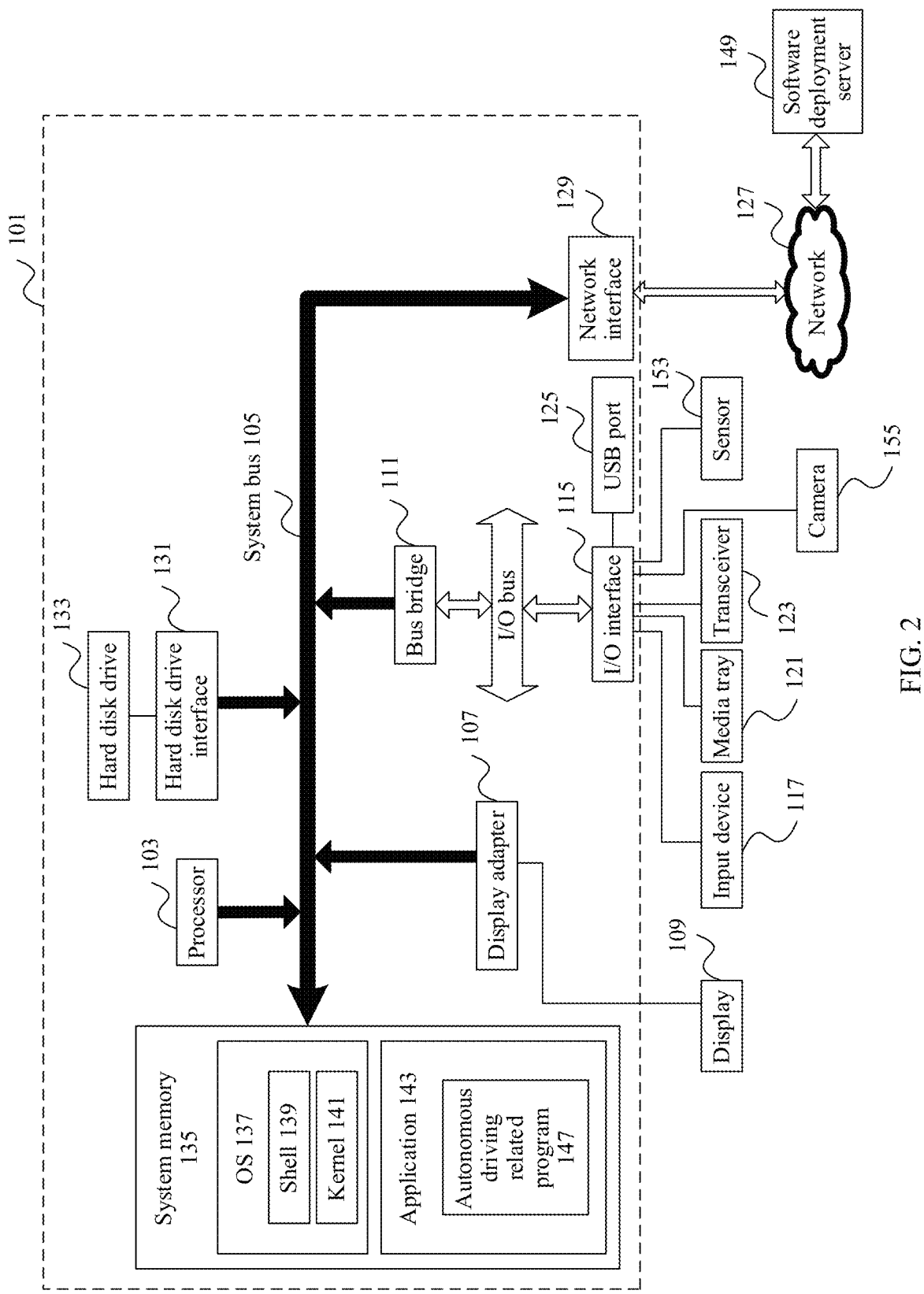
FIG. 2 is a schematic structural diagram of a computer system according to an embodiment of this application.

In an embodiment, as shown in FIG. 2, a computer 101 includes a processor 103, and the processor 103 is coupled to a system bus 105. The processor 103 may be one or more processors, and each processor may include one or more processor cores. A display adapter (video adapter) 107, where the display adapter 107 may drive a display 109, and the display 109 is coupled to the system bus 105. The system bus 105 is coupled to an input/output bus (I/O BUS or I/O bus) by using a bus bridge 111. An I/O interface 115 is coupled to the I/O bus. The I/O interface 115 communicates with a plurality of I/O devices, such as an input device 117 (for example, a keyboard, a mouse, or a touchscreen), a media tray 121 (for example, a CD-ROM or a multimedia interface), a transceiver 123 (which can send and/or receive a radio communications signal), a camera 155 (which can capture static and dynamic digital video images), and an external USB port 125. In some embodiments, an interface connected to the I/O interface 115 may be a USB port.

The processor 103 may be any conventional processor, including a reduced instruction set computing ("RISC") processor, a complex instruction set computing ("CISC") processor, or a combination thereof. In some embodiments, the processor may be a dedicated apparatus such as an application-specific integrated circuit ("ASIC"). In some embodiments, the processor 103 may be a neural network processor or a combination of the neural network processor and the foregoing conventional processor.

In some embodiments, in various embodiments described herein, the computer 101 may be located far away from the vehicle 100 and may wirelessly communicate with the vehicle 100. In other aspects, some of the processes described herein are performed by the processor disposed in the vehicle 100, and others are performed by the remote processor, including taking actions necessary for single manipulation.

The computer 101 may communicate with a software deployment server 149 by using a network interface 129. The network interface 129 is a hardware network interface, such as a network adapter. The network 127 may be an external network, such as the Internet, or an internal network, such as the Ethernet or a virtual private network (for example, a virtual private network (VPN)). In some embodiments, the network 127 may alternatively be a wireless network, for example, a Wi-Fi network or a cellular network.

A hard disk drive interface is coupled to the system bus 105. The hardware drive interface is connected to a hard disk drive. A system memory 135 is coupled to the system bus 105. Data run in the system memory 135 may include an operating system (OS) 137 and an application 143 of the computer 101.

The operating system includes a shell 139 and a kernel 141. The shell 139 is an interface between a user and the kernel of the operating system. The shell is an outermost layer of the operating system. The shell manages interaction between the user and the operating system, waits for an input of the user, explains the input of the user to the operating system, and processes various output results of the operating system.

The kernel 141 includes those parts of the operating system that are used for managing memories, files, peripherals, and system resources. The kernel directly interacts with hardware. The kernel of the operating system usually runs processes and provides inter-process communication, CPU time slice management, interruption, memory management, I/O management, and the like.

The application 143 includes a related program 147 controlling autonomous driving of an automobile, for example, a program managing interaction between an autonomous driving automobile and an obstacle on a road, a program controlling a route or a speed of the autonomous driving automobile, or a program controlling interaction between the autonomous driving automobile and another autonomous driving automobile on the road. The application 143 also exists on a system of the software deployment server 149. In an embodiment, when the application 143 needs to be executed, the computer 101 may download the application 143 from the software deployment server 149.

For example, the application 143 may include a related program for the vehicle 100 to pass through a barrier gate crossbar. The processor 103 receives the data that is of the plurality of to-be-detected barrier gate crossbars and that is obtained by the sensor system 104, obtains the pose of the target barrier gate crossbar based on a road map, determines the data of the target barrier gate crossbar from the data of the plurality of to-be-detected barrier gate crossbars by using the pose of the target barrier gate crossbar, and determines the status of the target barrier gate crossbar by using the data of the target barrier gate crossbar. If the processor 103 is located in the vehicle 100, the processor 103 may control, based on the status of the target barrier gate crossbar, the vehicle 100 to pass through the target barrier gate crossbar. If the processor 103 is located far away from the vehicle 100, the processor 103 may send a control instruction to the processor 113, and the processor 113 controls the travel system 102 of the vehicle 100 to pass through the target barrier gate crossbar.

A sensor 153 is associated with the computer 101. The sensor 153 is configured to detect an environment around the computer 101. For example, the sensor 153 may detect an animal, an automobile, an obstacle, a crosswalk, and the like. Further, the sensor 153 may also detect an environment around an object such as the foregoing animal, automobile, obstacle, or crosswalk, for example, an environment around an animal, for example, another animal that appears around the animal, weather conditions, or brightness of a surrounding environment. In some embodiments, if the computer 101 is located in an autonomous driving automobile, the sensor 153 may be a camera, an infrared sensor, a chemical detector, a microphone, or the like.

For example, the processor 153 may detect the data of the plurality of to-be-detected barrier gate crossbars in the surrounding environment of the vehicle 100, the processor 103 determines two-dimensional coordinates of the plurality of to-be-detected barrier gate crossbars by using a target position detection model and the data of the plurality of to-be-detected barrier gate crossbars, to determine the target barrier gate crossbar from the plurality of to-be-detected barrier gate crossbars based on the two-dimensional coordinates of the plurality of to-be-detected barrier gate crossbars, and determine the state of the target position detection model, and control the vehicle 100 to pass through the target barrier gate crossbar. The target position detection model may be obtained by training based on sample data.

In some embodiments, an artificial intelligence (AI) chip is disposed in the computer 101, and the AI chip periodically trains the received sample data to generate the target position detection model. The AI chip may also be referred to as a neural network processor (NPU). For example, the AI chip may be the processor 103. The processor 103 stores target position detection models, or, these target position detection models are stored in the memory by using the system bus 105. A form of the AI chip may be a chip or another physical component, for example, may be a training chip used for constructing a neural network model, or may be an inference chip that performs inference by using a neural network model. The neural network model may also be referred to as an artificial neural network, a neural network (NNs), or a connection model. The so-called "artificial neural network" is an algorithmic mathematical model that performs distributed parallel information processing by using a structure similar to brain synaptic connections. The artificial neural network relies on complexity of the system and adjusts connections between a large quantity of internal nodes to process information. The AI chip periodically trains the sample data, to generate the target position detection model, to better adapt to a change of the target position detection model.

Figure 3:
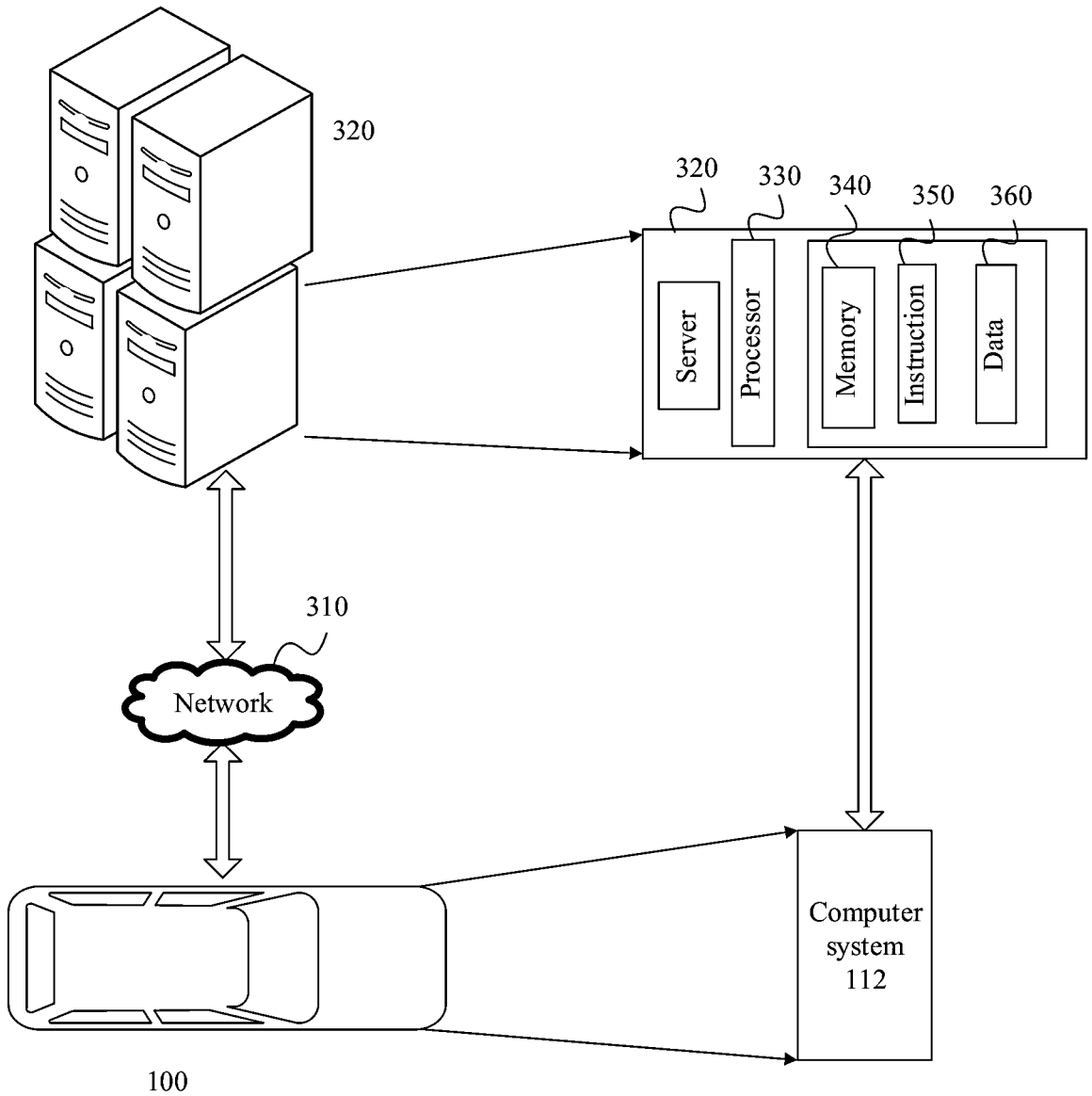
FIG. 3 is a schematic diagram of application of a cloud-side instruction automobile according to an embodiment of this application.

In some embodiments, the computer system 112 may also receive information from or transfer information to other computer systems. Alternatively, the sensor data collected by the sensor system 104 of the vehicle 100 may be transferred to another computer for processing. For example, data from the computer system 112 may be transmitted via a network to a cloud service center for further processing. For example, FIG. 3 is a schematic diagram of composition of a vehicle 100 and a cloud service center according to an embodiment of this application. The vehicle 100 may exchange data with the cloud service center 320 by using a network 310.

The network 310 and intermediate nodes may include various configurations and protocols, including the Internet, the World Wide Web, an intranet, a virtual private network, a wide area network, a local area network, a private network using proprietary communication protocols of one or more companies, the Ethernet, Wi-Fi, and HTTP, and various combinations thereof. Such communication may be performed by any device that can transmit data to and from other computers, such as a modem or a wireless interface.

In an example, the cloud service center 320 may include a server including a plurality of computers, such as a load balance server farm, which exchanges information with different nodes of the network 310 for the purpose of receiving data from the computer system 112, processing the data, and transmitting the data. The cloud service center 320 may be configured in a way similar to a way in which the computer system 112 is configured, and has a processor 330, a memory 340, an instruction 350, and data 360.

The cloud service center 320 runs, based on received data, a related program controlling autonomous driving of an automobile stored in the cloud service center 320, to control the vehicle 100. The related program controlling autonomous driving of an automobile may be a program managing interaction between an autonomous driving automobile and an obstacle on a road, a program controlling a route or a speed of the autonomous driving automobile, or a program controlling interaction between the autonomous driving automobile and another autonomous driving automobile on the road.

In some examples, the cloud service center 320 sends a suggested solution for possible driving conditions in the environment (for example, telling an obstacle ahead and how to get around it) to the vehicle 100. For example, the cloud service center 320 may assist the vehicle 100 in determining how to travel when facing a particular obstacle in the environment. The cloud service center 320 sends, to the vehicle 100, a response indicating how the vehicle 100 should travel in a given scene. For example, the cloud service center 320 may confirm, based on the collected sensor data, that there is a temporary stop sign on a road ahead, and further determine, based on a "lane closed" sign and sensor data of a construction vehicle on the lane, that the lane is closed due to construction. Correspondingly, the cloud service center 320 sends a suggested operation mode (for example, indicating the vehicle to change lanes onto another road) for the vehicle 100 to pass through the obstacle. When the cloud service center 320 observes a video stream in an operating environment of the cloud service center 320 and has confirmed that the vehicle 100 can safely and successfully pass through the obstacle, the operations used for the vehicle 100 may be added to a driving information map. Correspondingly, this information may be sent to other vehicles that may encounter a same obstacle in the region, to assist the other vehicles not only in recognizing the closed lane but also in knowing how to pass. In another example, the cloud service center 320 may determine, based on the collected sensor data, that there is a barrier gate crossbar ahead of the road on which the vehicle 100 is located. Correspondingly, the cloud service center 320 sends a suggested operation mode for the vehicle 100 to pass through the barrier gate crossbar of the road on which the vehicle 100 is located.

Next, the following describes in detail, with reference to the accompanying drawings, that the vehicle 100 passes through the barrier gate crossbar of the road on which the vehicle 100 is located in an autonomous driving mode.

Figure 4:
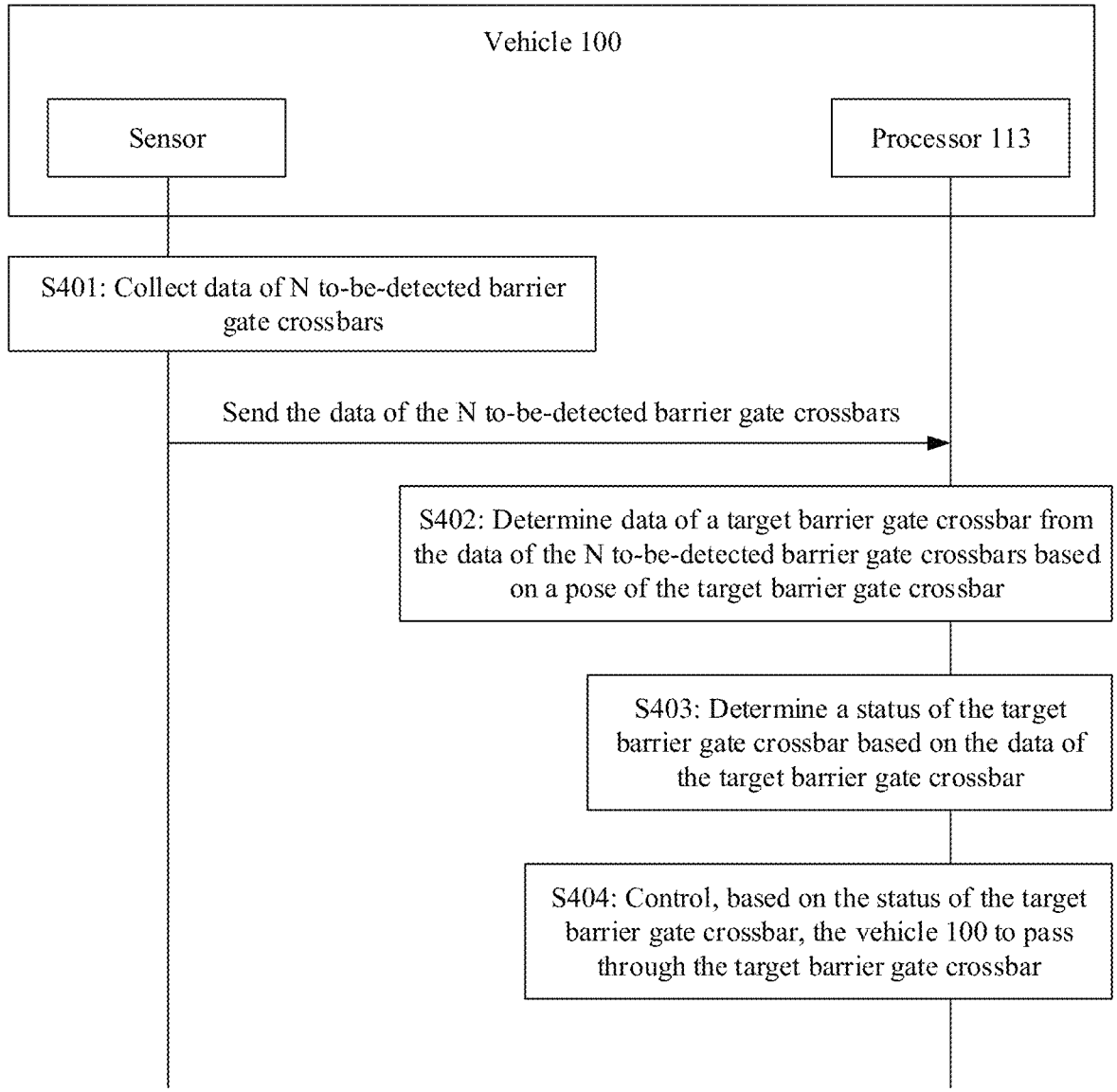
FIG. 4 is a flowchart of a method for passing through a barrier gate crossbar by a vehicle according to an embodiment of this application.

FIG. 4 is a flowchart of a method for passing through a barrier gate crossbar by a vehicle according to an embodiment of this application. Description is provided herein by using an example in which a processor 113 in a vehicle 100 controls, based on data obtained by a sensor system 104, the vehicle 100 to pass through a barrier gate crossbar of a road on which the vehicle 100 is located.

S401: One or more sensors in the vehicle 100 collect data of N to-be-detected barrier gate crossbars.

The sensor system 104 includes one or more sensors. The one or more sensors may be mounted at positions such as front, rear, and side positions of the vehicle 100. In a traveling process, the vehicle 100 may sense an object in a surrounding environment of the vehicle 100 by using the one or more sensors, to avoid the object, so that the vehicle 100 can normally travel, thereby avoiding traffic accidents. For example, when the vehicle 100 enters or exits from a place such as a park or a parking lot, the data of the N to-be-detected barrier gate crossbars in the surrounding environment of the vehicle 100 may be sensed by using the one or more sensors. N is an integer greater than or equal to 1. It may be understood that, the N to-be-detected barrier gate crossbars include a barrier gate crossbar of a lane on which the vehicle 100 is located and a barrier gate crossbar of a lane opposite to the vehicle 100.

Figure 5:
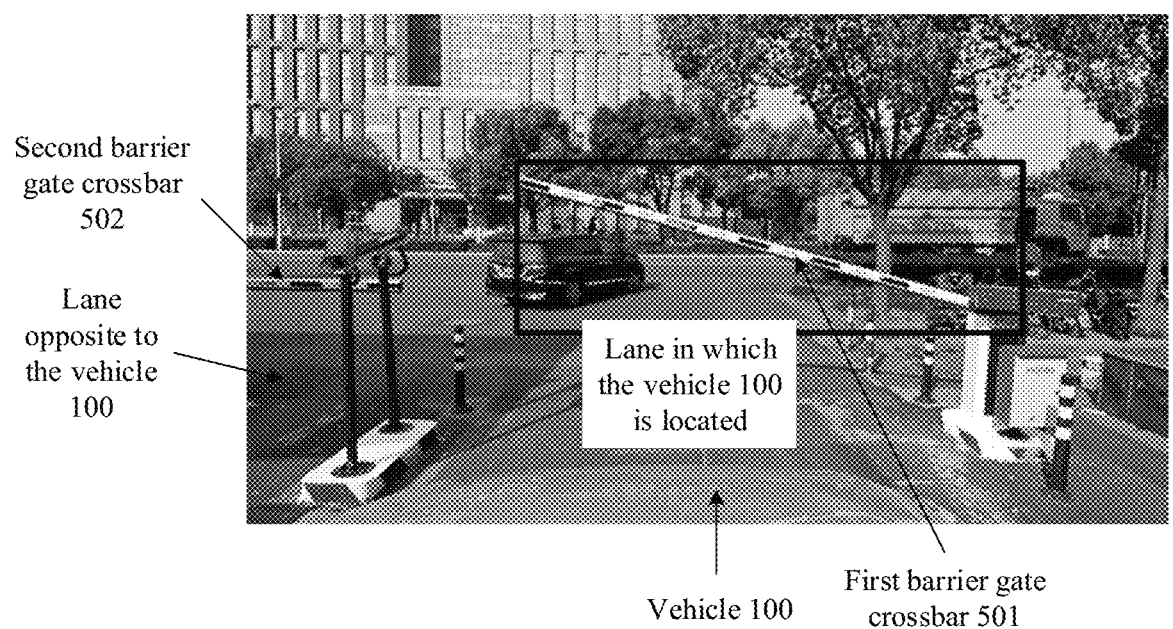
FIG. 5 is a schematic diagram of barrier gate crossbars in a surrounding environment of a vehicle according to an embodiment of this application.

For example, FIG. 5 is a schematic diagram of barrier gate crossbars in the surrounding environment of the vehicle 100. As shown in FIG. 5, the vehicle 100 may sense the barrier gate crossbars in the surrounding environment of the vehicle 10 by using the one or more sensors. In some embodiments, the barrier gate crossbars in the surrounding environment of the vehicle 100 include the barrier gate crossbar of the lane on which the vehicle 100 is located and the barrier gate crossbar of the lane opposite to the vehicle 100. For example, a first barrier gate crossbar 501 shown in FIG. 5 is the barrier gate crossbar of the lane on which the vehicle 100 is located, and a second barrier gate crossbar 502 is the barrier gate crossbar of the lane opposite to the vehicle 100.

Types of data of barrier gate crossbars obtained by different sensors may be different.

For example, if the sensor is a camera 130, the data of the barrier gate crossbars is image data. The image data is a set of grayscale values (pixel) that are of pixels and that are represented by values. It may be understood that, the image data is two-dimensional data, such as an image of the first barrier gate crossbar and an image of the second barrier gate crossbar shown in FIG. 5.

In another example, if the sensor is a radar 126, the data of the barrier gate crossbars is point cloud data. The point cloud data is a set of points for representing a shape of an object. It may be understood that, the point cloud data is three-dimensional data, and each point includes three-dimensional coordinates. Some points may further include color information (RGB) or reflection intensity information.

In an autonomous driving mode, the vehicle 100 may travel based on a road map. The road map may be a high-precision map, and records information about a static object around a lane. For example, the road map records information about a preplanned barrier gate crossbar in a lane. Therefore, in a process in which the vehicle 100 travels based on the road map, the vehicle 100 may obtain a pose of the barrier gate crossbar of the lane on which the vehicle 100 is located. It may be understood that, the barrier gate crossbar of the lane on which the vehicle 100 is located is a target barrier gate crossbar. The target barrier gate crossbar is a barrier gate crossbar that the vehicle 100 is to pass through. However, the vehicle 100 does not know a state of the barrier gate crossbar that the vehicle 100 is to pass through.

Further, the vehicle 100 may sense the N to-be-detected barrier gate crossbars in the surrounding environment of the vehicle 100 by using the one or more sensors, to obtain the data of the N to-be-detected barrier gate crossbars. However, the vehicle 100 does not know data of which barrier gate crossbar in the data of the N to-be-detected barrier gate crossbars is the data of the barrier gate crossbar of the lane on which the vehicle 100 is located. Therefore, the vehicle 100 determines the data of the target barrier gate crossbar from the data of the N to-be-detected barrier gate crossbars based on the pose of the target barrier gate crossbar, and determines the status of the target barrier gate crossbar by using the data of the target barrier gate crossbar. In this way, the vehicle 100 passes through the target barrier gate crossbar based on the status of the target barrier gate crossbar. Refer to descriptions of the following S402 to S404 for detailed explanations of passing through the target barrier gate crossbar.

S402: The processor 113 determines the data of the target barrier gate crossbar from the data of the N to-be-detected barrier gate crossbars based on the pose of the target barrier gate crossbar.

In the autonomous driving mode, the vehicle 100 travels based on a planned road. For example, the vehicle 100 travels based on a pre-configured road map. The road map not only includes lane information, but also includes object information in the surrounding environment of a lane, for example, poses of the barrier gate crossbars in the surrounding environment of the vehicle 100. Therefore, the vehicle 100 may determine the data of the barrier gate crossbar of the lane on which the vehicle 100 is located from the detected data of the barrier gate crossbars by using the poses of the barrier gate crossbars in the surrounding environment. The processor 113 may receive the data detected by the one or more sensors.

The processor 113 determines first coordinates of each of the N to-be-detected barrier gate crossbars based on data of the to-be-detected barrier gate crossbar; determines coordinates of the target barrier gate crossbar based on the pose of the target barrier gate crossbar; determines N Euclidean distances based on the first coordinates of the N to-be-detected barrier gate crossbars and the coordinates of the target barrier gate crossbar; and determines data of a barrier gate crossbar corresponding to a smallest Euclidean distance in the N Euclidean distances as the data of the target barrier gate crossbar.

S403: The processor 113 determines the status of the target barrier gate crossbar based on the data of the target barrier gate crossbar.

S404: The processor 113 controls, based on the status of the target barrier gate crossbar, the vehicle 100 to pass through the target barrier gate crossbar.

The status of the target barrier gate crossbar includes an open/close state, and the open/close state of the target barrier gate crossbar includes open and close. The processor 113 controls, based on the open/close state of the target barrier gate crossbar, the vehicle 100 to pass through the target barrier gate crossbar. For example, when the open/close state of the target barrier gate crossbar is open, the vehicle 100 is controlled to travel. In another example, when the open/close state of the target barrier gate crossbar is close, the vehicle 100 is controlled to stop.

In some embodiments, the status of the target barrier gate crossbar further includes a motion state, and the motion state of the target barrier gate crossbar includes ascending, descending, and static. The processor 113 controls, based on the open/close state and the motion state of the target barrier gate crossbar, the vehicle 100 to pass through the target barrier gate crossbar.

In one embodiment, when the open/close state of the target barrier gate crossbar is open, and the motion state of the target barrier gate crossbar is ascending, the vehicle 100 is controlled to travel.

In another embodiment, when the open/close state of the target barrier gate crossbar is open, and the motion state of the target barrier gate crossbar is static, the vehicle 100 is controlled to travel. It may be understood that, that the open/close state of the target barrier gate crossbar is open and the motion state of the target barrier gate crossbar is static means that the target barrier gate crossbar is perpendicular to the ground, and is in a completely open state.

In another embodiment, when the open/close state of the target barrier gate crossbar is open, and the motion state of the target barrier gate crossbar is descending, the vehicle 100 is controlled to stop.

In another embodiment, when the open/close state of the target barrier gate crossbar is close, and the motion state of the target barrier gate crossbar is descending, the vehicle 100 is controlled to stop.

In another embodiment, when the open/close state of the target barrier gate crossbar is close, and the motion state of the target barrier gate crossbar is static, the vehicle 100 is controlled to stop. It may be understood that, that the open/close state of the target barrier gate crossbar is close and the motion state of the target barrier gate crossbar is static means that the target barrier gate crossbar is parallel to the ground, and is in a completely close state.

In another embodiment, when the open/close state of the target barrier gate crossbar is close, and the motion state of the target barrier gate crossbar is ascending, the vehicle 100 is controlled to stop.

A method for determining the open/close state and the motion state of the target barrier gate crossbar will be described below.

According to the method for passing through a barrier gate crossbar by a vehicle provided in this application, the vehicle 100 obtains the data of the plurality of to-be-detected barrier gate crossbars in the surrounding environment of the vehicle 100 by using the one or more sensors, determines the data of the target barrier gate crossbar from the data of the plurality of to-be-detected barrier gate crossbars based on the pose of the target barrier gate crossbar, to determine the status of the target barrier gate crossbar based on the data of the target barrier gate crossbar, so that the vehicle 100 controls, by using the status of the target barrier gate crossbar, the vehicle 100 to pass through the target barrier gate crossbar.

Figure 6:
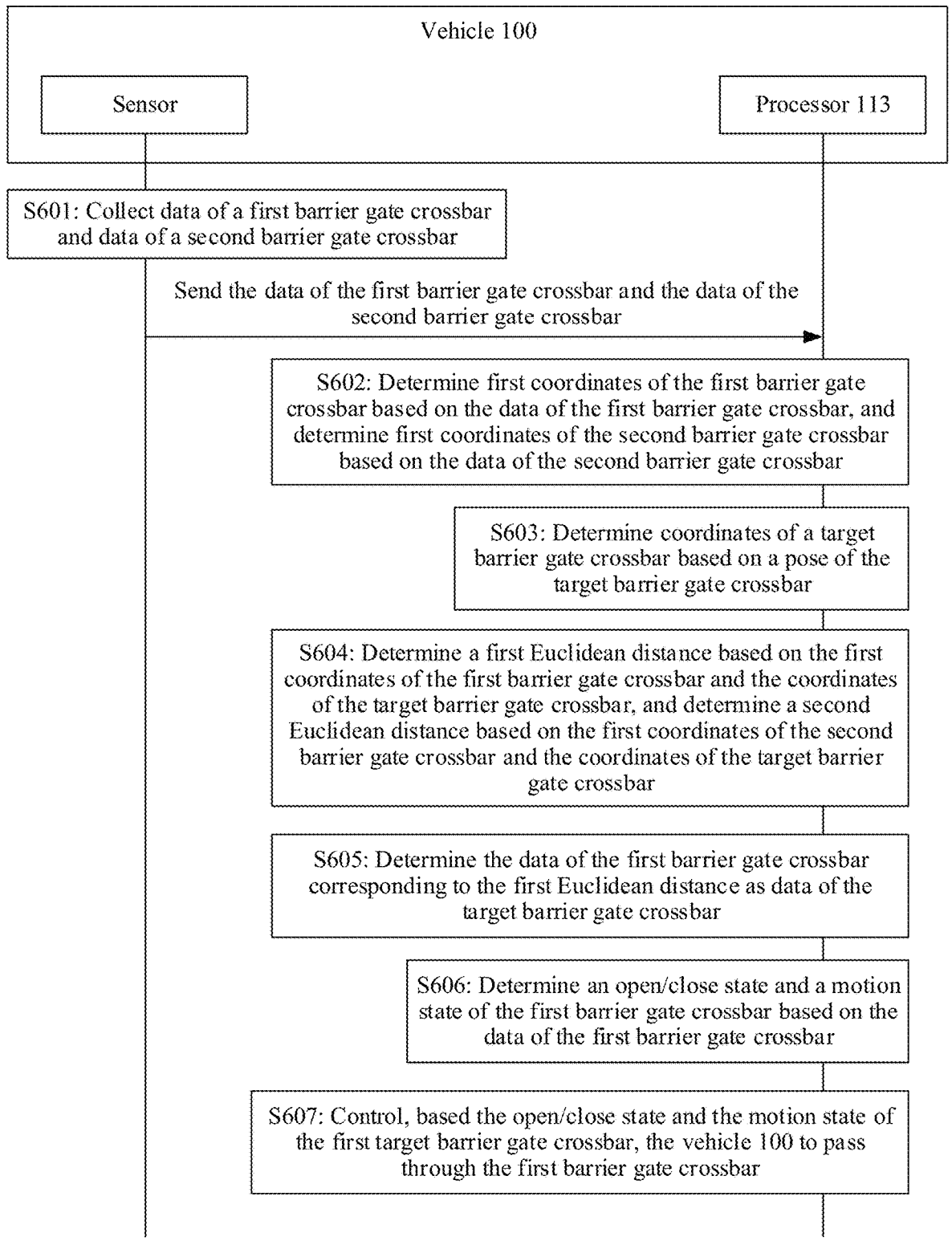
FIG. 6 is a flowchart of a method for passing through a first barrier gate crossbar by a vehicle according to an embodiment of this application.

Description is provided below by using an example in which data of two to-be-detected barrier gate crossbars around the vehicle 100 is obtained. For example, the vehicle 100 may obtain data of the first barrier gate crossbar and data of the second barrier gate crossbar around the vehicle 100 by using the one or more sensors. As shown in FIG. 6, the method includes the following operations.

S601: One or more sensors in a vehicle 100 collect data of a first barrier gate crossbar and data of a second barrier gate crossbar.

In this specification, it is assumed that a barrier gate crossbar that the vehicle 100 is to pass through is the first barrier gate crossbar. In other words, the first barrier gate crossbar is a target barrier gate crossbar (a barrier gate crossbar of a lane on which the vehicle 100 is located).

After obtaining the data of the first barrier gate crossbar and the data of the second barrier gate crossbar, the vehicle 100 determines, by using a processor 113, data of the target barrier gate crossbar from the data of the first barrier gate crossbar and the data of the second barrier gate crossbar based on a pose of the target barrier gate crossbar, to be specific, determines the data of the first barrier gate crossbar as the data of the target barrier gate crossbar. Refer to descriptions of the following S602 to S605 for details.

S602: The processor 113 determines first coordinates of the first barrier gate crossbar based on the data of the first barrier gate crossbar, and determines first coordinates of the second barrier gate crossbar based on the data of the second barrier gate crossbar.

The processor 113 receives the data that are of the first barrier gate crossbar and the second barrier gate crossbar and that are collected by the one or more sensors.

If the sensor is a camera 130, images shot by the camera 130 include an image of the first barrier gate crossbar and an image of the second barrier gate crossbar. It may be understood that the data of the first barrier gate crossbar is image data. The data of the second barrier gate crossbar is image data. The first coordinates of the first barrier gate crossbar and the first coordinates of the second barrier gate crossbar are both coordinates in a two-dimensional coordinate system.

First, the processor 113 determines the first coordinates of the first barrier gate crossbar based on the data of the first barrier gate crossbar and a target position detection model, and determines the first coordinates of the second barrier gate crossbar based on the data of the second barrier gate crossbar and the target position detection model.

Before the first coordinates of the first barrier gate crossbar and the first coordinates of the second barrier gate crossbar are determined, a large amount of sample data may be trained by using machine learning or artificial neutral networks (Artificial Neural Networks, ANNs), to obtain the target position detection model. For example, an AI chip trains the sample data to obtain the target position detection model. The target position detection model is used for outputting coordinates of a barrier gate crossbar based on image data of the barrier gate crossbar.

In some embodiments, a processor training the sample data is not limited. For example, if the processor 113 is the AI chip, the processor 113 may train the sample data to obtain the target position detection model. In another example, the sample data may alternatively be trained by another neutral network processor outside the vehicle 100, to obtain the target position detection model.

Figure 7:
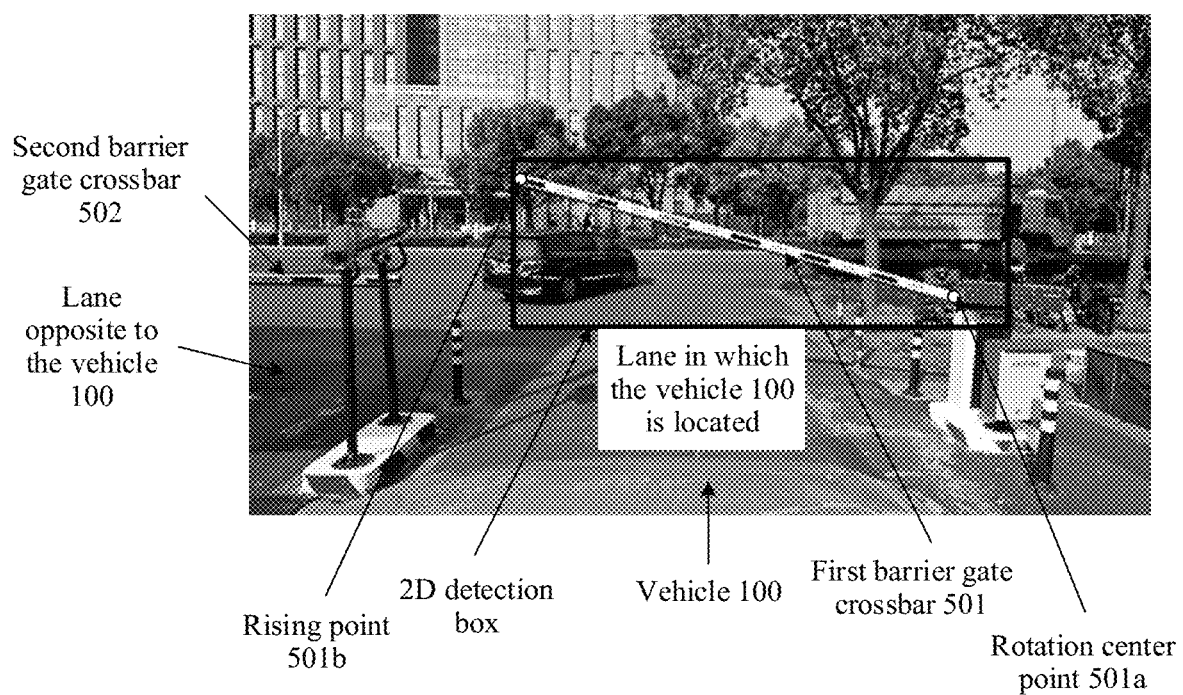
FIG. 7 is a schematic diagram of a first barrier gate crossbar in a surrounding environment of a vehicle according to an embodiment of this application.

Further, the processor 113 may input the image data of the first barrier gate crossbar into the target position detection model, the target position detection model performs inference operation, and outputs a 2D detection box and key points of the first barrier gate crossbar. The 2D detection box is a compact bounding rectangular box of the first barrier gate crossbar on the image. The key points are two points with semantic information, and are respectively a rotation center point and a rising point. For example, FIG. 7 shows the first barrier gate crossbar 501 compactly bounded by the 2D detection box. The first barrier gate crossbar 501 includes a rotation center point 501a and a rising point 501b. It may be understood that, the first coordinates of the first barrier gate crossbar 501 include two endpoints of the first barrier gate crossbar 501: the rotation center point 501a of the first barrier gate crossbar 501 and the rising point 501b of the first barrier gate crossbar 501.

Similarly, the processor 113 may input the image data of the second barrier gate crossbar into the target position detection model, the target position detection model performs inference operation, and outputs a 2D detection box and key points of the second barrier gate crossbar. The key points include a rotation center point of the second barrier gate crossbar and a rising point of the second barrier gate crossbar.

In some other embodiments, if the sensor is a radar 126, point cloud data scanned by the radar 126 includes point cloud data of the first barrier gate crossbar and point cloud data of the second barrier gate crossbar. The first coordinates of the first barrier gate crossbar and the first coordinates of the second barrier gate crossbar are both coordinates in a three-dimensional coordinate system.

The processor 113 determines a three-dimensional model of the first barrier gate crossbar based on the point cloud data of the first barrier gate crossbar, determines the first coordinates of the first barrier gate crossbar based on the three-dimensional model of the first barrier gate crossbar, determines a three-dimensional model of the second barrier gate crossbar based on the point cloud data of the second barrier gate crossbar, and determines the first coordinates of the second barrier gate crossbar based on the three-dimensional model of the second barrier gate crossbar.

For example, the radar 126 may be a LiDAR. The LiDAR obtains, in real time, the point cloud data of the first barrier gate crossbar, and sends the point cloud data of the first barrier gate crossbar to the processor 113. The processor 113 obtains a pose of the first barrier gate crossbar based on a road map, and filters out irrelevant point cloud data by using the pose of the first barrier gate crossbar. For remaining point cloud, impact of outliers is eliminated by using a random sampling consistent (Random sampling consistent, RANSAC) algorithm, to obtain processed point cloud data, and the processed point cloud data is fitted with a straight line, to obtain the three-dimensional model of the first barrier gate crossbar.

Similarly, the LiDAR obtains, in real time, the point cloud data of the second barrier gate crossbar, and sends the point cloud data of the second barrier gate crossbar to the processor 113. The processor 113 obtains a pose of the second barrier gate crossbar based on the road map, and filters out irrelevant point cloud data by using the pose of the second barrier gate crossbar. For remaining point cloud, impact of outliers is eliminated by using the RANSAC algorithm, to obtain processed point cloud data, and the processed point cloud data is fitted with a straight line, to obtain the three-dimensional model of the second barrier gate crossbar.

S603: The processor 113 determines coordinates of the target barrier gate crossbar based on the pose of the target barrier gate crossbar.

In some embodiments, the processor 113 determines a pose of the camera 130 based on a pose of the vehicle 100 and an extrinsic parameter of the camera 130.

The processor 113 may obtain the pose of the vehicle 100, namely, pose information of a rear axle center point of the vehicle 100 in a world coordinate system, by using a GPS or an IMU mounted on the vehicle 100.

It may be understood that, the extrinsic parameter of the camera 130 is pose information of the camera 130 relative to another reference object in the world coordinate system. The extrinsic parameter of the camera 130 includes a rotation matrix and a translation matrix. The rotation matrix and the translation matrix together describe a conversion relationship of a point between the world coordinate system and a camera coordinate system. The rotation matrix describes a direction of a coordinate axis of the world coordinate system relative to a coordinate axis of the camera coordinate system. The translation matrix describes a position of a spatial origin in the camera coordinate system.

The camera 130 mounted on the vehicle 100 is provided with the extrinsic parameter of the camera 130. In this specification, the extrinsic parameter of the camera 130 may be pose information relative to the rear axle center point of the vehicle 100.

The processor 113 performs matrix operation based on the pose of the vehicle 100 and the extrinsic parameter of the camera 130, to determine the pose of the camera 130, namely, the pose of the camera 130 in the world coordinate system. The pose of the camera 130 indicates a conversion relationship between three-dimensional coordinates of an object in the world coordinate system and three-dimensional coordinates of the object in the camera coordinate system.

Further, the processor 113 determines the coordinates of the target barrier gate crossbar based on the pose of the target barrier gate crossbar, the pose of the camera 130, and an intrinsic parameter of the camera 130.

The pose of the target barrier gate crossbar includes three-dimensional coordinates of the target barrier gate crossbar in the world coordinate system. The processor 113 may obtain the pose of the target barrier gate crossbar by using the road map.

The intrinsic parameter of the camera 130 is a parameter related to characteristics of the camera itself, for example, a focal length or a pixel size of the camera 130. The intrinsic parameter of the camera 130 indicates a conversion relationship between three-dimensional coordinates of an object in the camera coordinate system and two-dimensional coordinates of the object in an image coordinate system on a shot image.

In some embodiments, the processor 113 converts the pose of the target barrier gate crossbar from the world coordinate system to the camera coordinate system by using the pose of the camera 130, to obtain the pose of the target barrier gate crossbar in the camera coordinate system.

The processor 113 converts the pose of the target barrier gate crossbar in the camera coordinate system to the coordinates of the target barrier gate crossbar in the image coordinate system by using the intrinsic parameter of the camera 130, to obtain the coordinates of the target barrier gate crossbar.

S604: The processor 113 determines a first Euclidean distance based on the first coordinates of the first barrier gate crossbar and the coordinates of the target barrier gate crossbar and determines a second Euclidean distance based on the first coordinates of the second barrier gate crossbar and the coordinates of the target barrier gate crossbar.

The Euclidean distance is a distance definition that is usually used. The Euclidean distance is also referred to as euclidean metric. The Euclidean distance is an actual distance between two points in an m-dimensional space, or a natural length (namely, a distance from the point to an origin) of a vector. The Euclidean distance in a two-dimensional space is an actual distance between two points. The Euclidean distance in the two-dimensional space satisfies the following formula (1).

$$\rho = \sqrt{(x_2-x_1)^2 + (y_2-y_1)^2} \quad (1)$$

where $\rho$ represents a Euclidean distance between a point $(x_2, y_2)$ and a point $(x_1, y_1)$.

For example, $(x_1, y_1)$ may be the first coordinates of the first barrier gate crossbar. $(x_2, y_2)$ may be the coordinates of the target barrier gate crossbar. In this case, the coordinates of the target barrier gate crossbar are coordinates in the two-dimensional coordinate system.

In another example, $(x_1, y_1)$ may be the first coordinates of the second barrier gate crossbar. $(x_2, y_2)$ may be the coordinates of the target barrier gate crossbar.

The Euclidean distance in the three-dimensional space satisfies the following formula (2).

$$\rho = \sqrt{(x_2-x_1)^2 + (y_2-y_1)^2 + (z_2-z_1)^2} \quad (1)$$

where $\rho$ represents a Euclidean distance between a point $(x_2, y_2, z_2)$ and a point $(x_1, y_1, z_1)$.

For example, $(x_1, y_1, z_1)$ may be the first coordinates of the first barrier gate crossbar. $(x_2, y_2, z_2)$ may be the coordinates of the target barrier gate crossbar. In this case, the coordinates of the target barrier gate crossbar are coordinates in the three-dimensional coordinate system.

In another example, $(x_1, y_1, z_1)$ may be the first coordinates of the second barrier gate crossbar. $(x_2, y_2, z_2)$ may be the coordinates of the target barrier gate crossbar.

A smaller Euclidean distance indicates a higher probability that a detected barrier gate crossbar is the target barrier gate crossbar. A larger Euclidean distance indicates a lower probability that a detected barrier gate crossbar is the target barrier gate crossbar. Therefore, the processor 113 may compare the first Euclidean distance with the second Euclidean distance, and determines a barrier gate crossbar corresponding to the smaller one in the first Euclidean distance and the second Euclidean distance as the target barrier gate crossbar. In this specification, assuming that the first Euclidean distance is less than the second Euclidean distance, the data of the target barrier gate crossbar corresponding to the first Euclidean distance is determined as the data of the target barrier gate crossbar. S605 is performed.

S605: The processor 113 determines the data of the first barrier gate crossbar corresponding to the first Euclidean distance as the data of the target barrier gate crossbar.

S606: The processor 113 determines an open/close state and a motion state of the first barrier gate crossbar based on the data of the first barrier gate crossbar.

The open/close state of the first barrier gate crossbar includes open and close. The motion state of the first barrier gate crossbar includes ascending, descending, and static. It may be understood that the data of the first barrier gate crossbar is the data of the target barrier gate crossbar.

Figure 8:
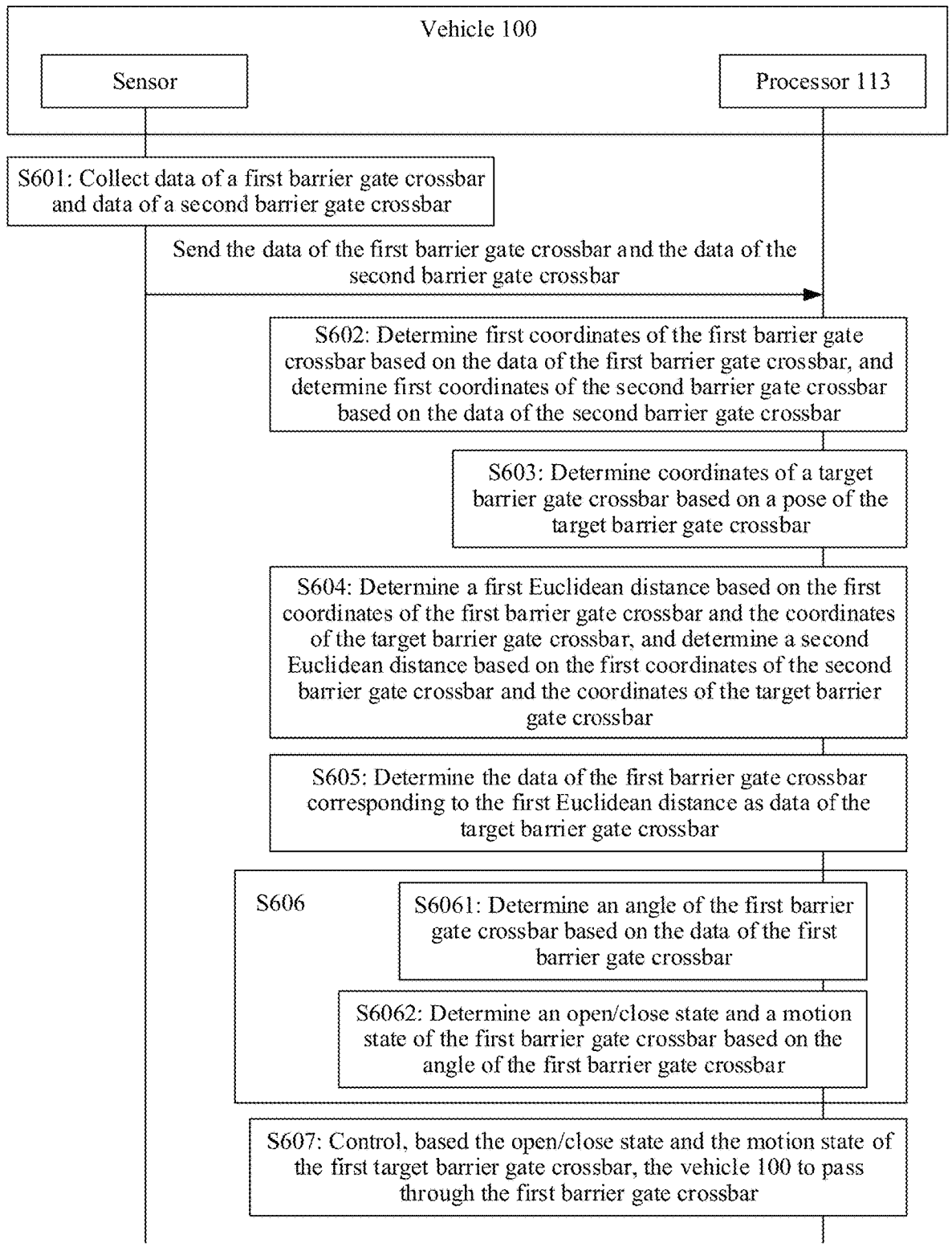
FIG. 8 is a flowchart of a method for passing through a first barrier gate crossbar by a vehicle according to an embodiment of this application.

In some embodiments, as shown in FIG. 8, determining the open/close state and the motion state of the first barrier gate crossbar based on the data of the first barrier gate crossbar includes the following detailed operations.

S6061: The processor 113 determines an angle of the first barrier gate crossbar based on the data of the first barrier gate crossbar.

The angle of the first barrier gate crossbar is an included angle between the first barrier gate crossbar and a reference straight line.

If the sensor is the camera 130, the processor 113 may determine the angle of the first barrier gate crossbar based on the first coordinates of the first barrier gate crossbar and the reference straight line. The first coordinates of the first barrier gate crossbar include first coordinates of two endpoints of the first barrier gate crossbar.

It should be understood that, the first coordinates of the first barrier gate crossbar are coordinates in the image coordinate system, namely, two-dimensional coordinates. In the two-dimensional coordinate system, the first barrier gate crossbar may be simulated into a straight line based on the two-dimensional coordinates of the two endpoints of the first barrier gate crossbar. An included angle between the straight line and the X-axis may be the angle of the first barrier gate crossbar. It may be understood that, the angle of the first barrier gate crossbar may be an included angle between the first barrier gate crossbar and the ground.

If the sensor is the radar 126, the three-dimensional model of the first barrier gate crossbar is projected onto a reference plane to obtain second coordinates of the first barrier gate crossbar. The second coordinates of the first barrier gate crossbar include second coordinates of the two endpoints of the first barrier gate crossbar. The second coordinates are coordinates in the two-dimensional coordinate system. The angle of the first barrier gate crossbar is determined based on the second coordinates of the first barrier gate crossbar and the reference straight line. The two-dimensional coordinate system may be the image coordinate system.

Figure 9:
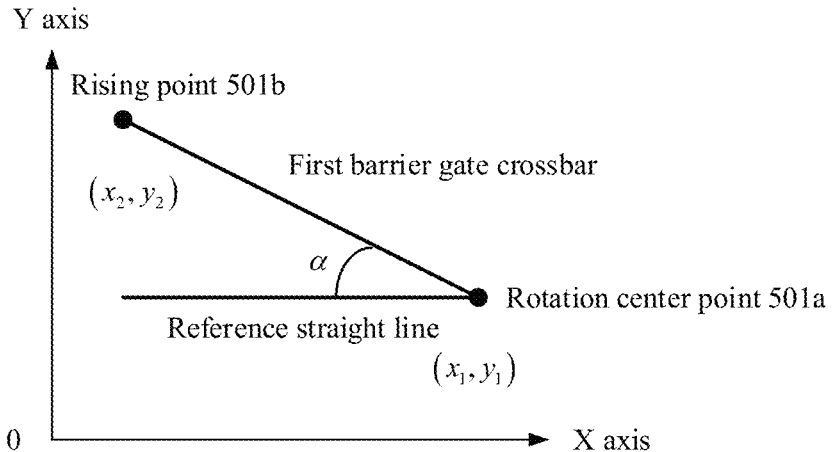
FIG. 9 is a schematic diagram of an angle of a first barrier gate crossbar according to an embodiment of this application.

For example, as shown in FIG. 9, coordinates of the rotation center point 501*a* are $(x_1, y_1)$, and coordinates of the rising point 501*b* are $(x_2, y_2)$. A line connecting two coordinate points: the rotation center point 501*a* and the rising point 501b may represent a straight line simulating the first barrier gate crossbar. α represents the angle of the first barrier gate crossbar.

S6062: The processor 113 determines the open/close state and the motion state of the first barrier gate crossbar based on the angle of the first barrier gate crossbar.

In some embodiments, if the angle of the first barrier gate crossbar is greater than a first preset angle, the processor 113 determines that the open/close state of the first barrier gate crossbar is open.

If the angle of the first barrier gate crossbar is less than a second preset angle, the processor 113 determines that the open/close state of the first barrier gate crossbar is close. The second preset angle is less than the first preset angle.

If the angle of the first barrier gate crossbar is less than or equal to the first preset angle, and the angle of the first barrier gate crossbar is greater than or equal to the second preset angle, the processor 113 determines that the open/close state of the first barrier gate crossbar is an open/close state that is of the first barrier gate crossbar and that is determined at a previous moment. It may be understood that, the open/close state of the first barrier gate crossbar determined at the previous moment may be the open/close state of the first barrier gate crossbar mostly recently determined by the processor 113.

Figure 10A:
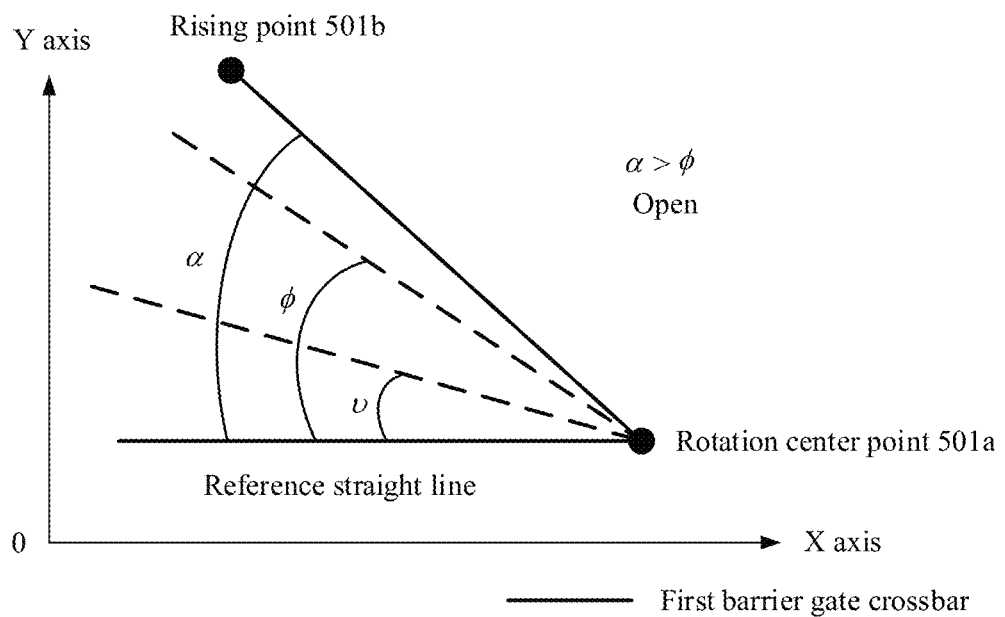
FIG. 10($a$) to FIG. 10($c$) are a schematic diagram of an open/close state of a first barrier gate crossbar according to an embodiment of this application.
Figure 10B:
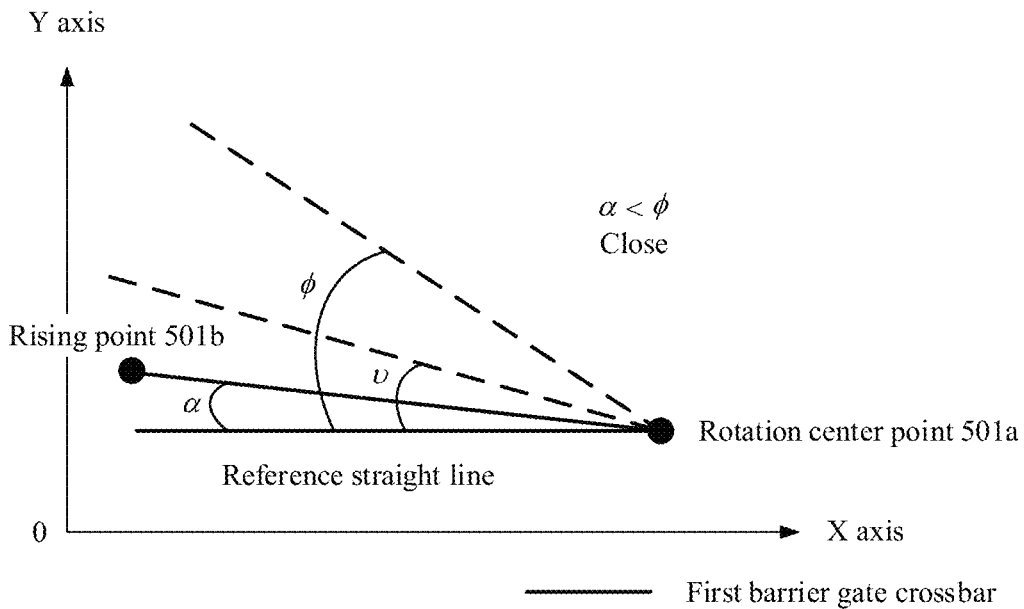
Figure 10C:
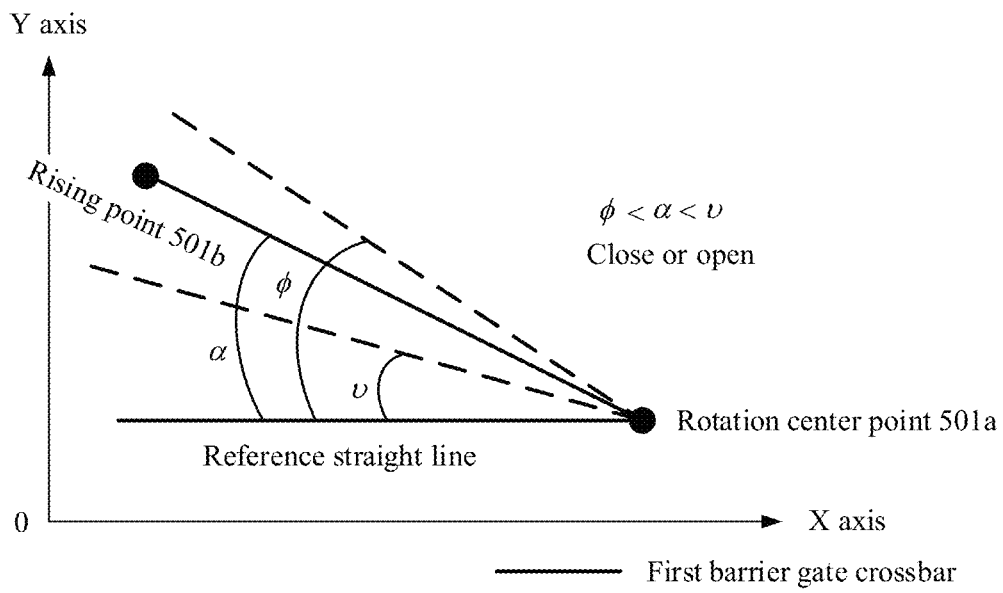

For example, it is assumed that $\phi$ represents the first preset angle, and $\nu$ represents the second preset angle. FIG. 10(a) is a schematic diagram showing that the angle of the first barrier gate crossbar is greater than the first preset angle. In this case, it indicates that the open/close state of the first barrier gate crossbar is open. FIG. 10(b) is a schematic diagram showing that the angle of the first barrier gate crossbar is less than the second preset angle. In this case, it indicates that the open/close state of the first barrier gate crossbar is close. FIG. 10(c) is a schematic diagram showing that the angle of the first barrier gate crossbar is less than or equal to the first preset angle, and the angle of the first preset angle is greater than or equal to the second preset angle. In this case, it indicates that the open/close state of the first barrier gate crossbar is close or open.

In some embodiments, if an $i^{th}$ angle of the first barrier gate crossbar is greater than an $(i-1)^{th}$ angle of the first barrier gate crossbar, it is determined that the motion state of the first barrier gate crossbar is ascending.

If the $i^{th}$ angle of the first barrier gate crossbar is less than the $(i-1)^{th}$ angle of the first barrier gate crossbar, it is determined that the motion state of the first barrier gate crossbar is descending.

The $i^{th}$ angle of the first barrier gate crossbar is determined based on the first barrier gate crossbar in an $i^{th}$ frame of image, the $(i-1)^{th}$ angle of the first barrier gate crossbar is determined based on the first barrier gate crossbar in an $(i-1)^{th}$ frame of image, and the $i^{th}$ frame of image is adjacent to the $(i-1)^{th}$ frame of image.

Figure 11A:
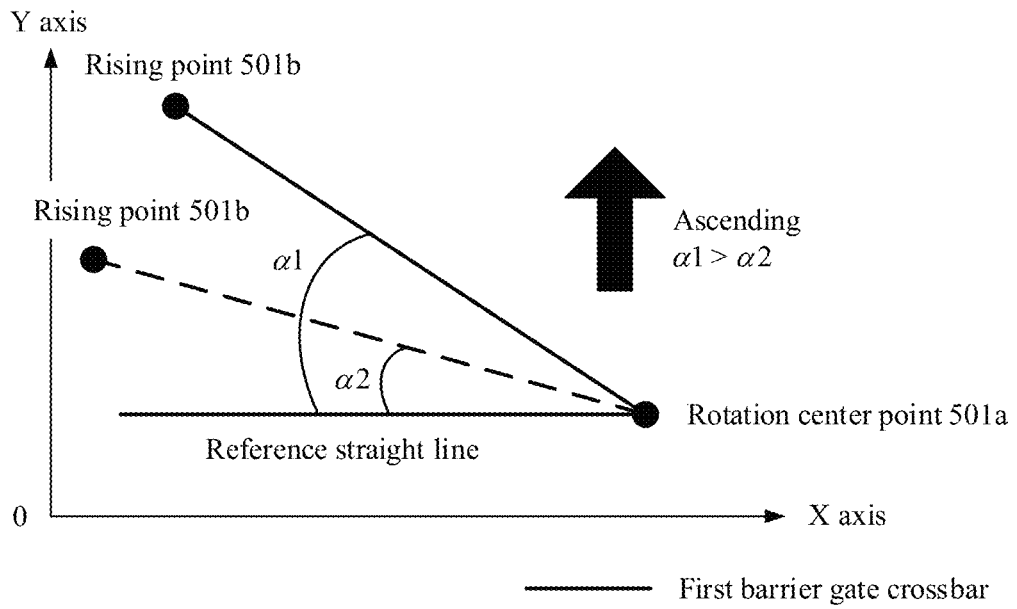
FIG. 11($a$) and FIG. 11($b$) are a schematic diagram of a motion state of a first barrier gate crossbar according to an embodiment of this application.
Figure 11B:
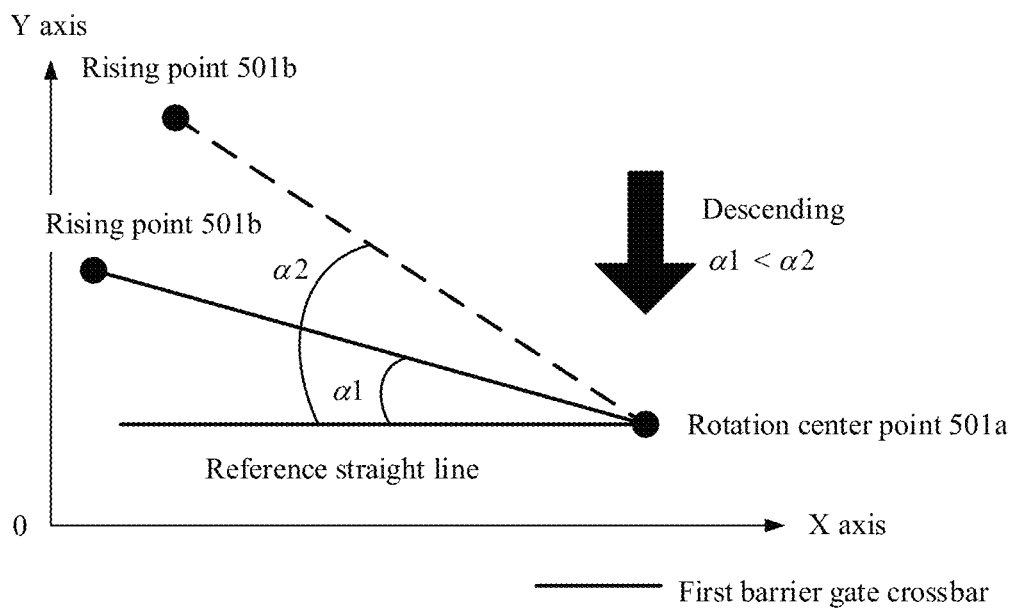

In some embodiments, the $i^{th}$ angle of the first barrier gate crossbar and the $(i-1)^{th}$ angle of the first barrier gate crossbar are assumed. FIG. 11(a) is a schematic diagram of ascending of the first barrier gate crossbar. In this case, α1>α2. FIG. 11(b) is a schematic diagram of descending of the first barrier gate crossbar. In this case, α1<α2.

S607: The processor 113 controls, based on the open/close state and the motion state of the first barrier gate crossbar, the vehicle 100 to pass through the first barrier gate crossbar.

In some embodiments, in a traveling process, the vehicle 100 continuously obtains data of a plurality of barrier gate crossbars in a surrounding environment of the vehicle by using the one or more sensors, and determines the open/close state and the motion state of the barrier gate crossbar of the lane on which the vehicle 100 is located by using a plurality of frames of images of the barrier gate crossbars.

In some embodiments, after obtaining the data of the barrier gate crossbar, the sensor feeds back a detection result to the processor 113. The detection result includes the data of the barrier gate crossbar, and a time stamp of the data of the barrier gate crossbar. After determining the angle of the barrier gate crossbar based on the data of the barrier gate crossbar, the processor 113 sorts angles of the barrier gate crossbar in a sequence based on time stamps, to form a sequence historical queue that is updated in real time.

The processor 113 performs data smoothing on the sequence historical queue by using an average value and a covariance of the angles of the barrier gate crossbar in a local window range in a manner of mobile filtering, to effectively correct a problem of a detection result jitter.

Figure 12:
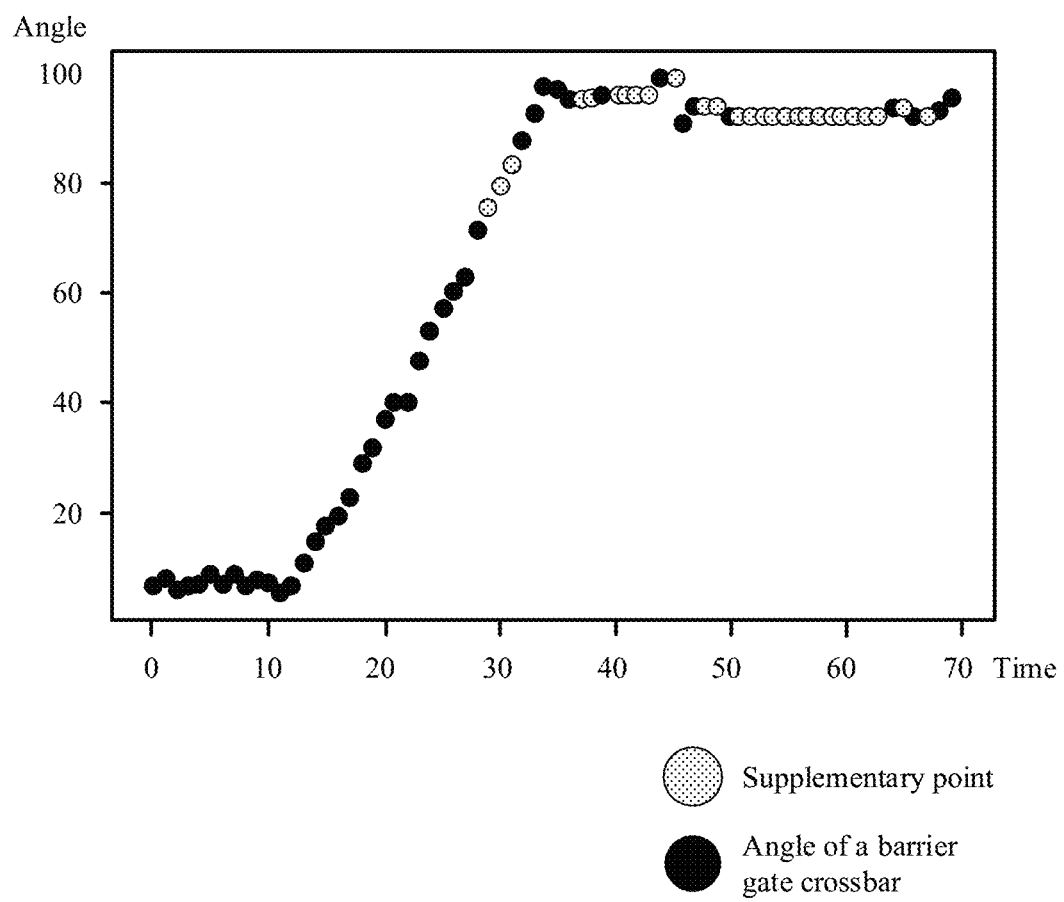
FIG. 12 is a schematic diagram of a sequence queue of angles of a barrier gate crossbar according to an embodiment of this application.

The processor 113 may further establish a first-order motion model by using the angles of the barrier gate crossbar as an observation amount based on historical frame information in the smoothed sequence queue, perform angle prediction on a frame that misses detection, and adds a supplementary point to the smoothed sequence queue. For example, FIG. 12 is a schematic diagram of the sequence queue of the angles of the barrier gate crossbar.

In addition, after determining the barrier gate crossbar of the lane on which the vehicle 100 is located, the processor 113 does not need to match the barrier gate crossbar of the lane on which the vehicle 100 is located, and only needs to determine the open/close state and the motion state of the barrier gate crossbar of the lane on which the vehicle 100 is located, and control the vehicle 100 to pass through the barrier gate crossbar of the lane on which the vehicle 100 is located.

The following describes a process in which the vehicle 100 passes through the first barrier gate crossbar by using examples with reference to FIG. 13(a) to FIG. 15(d). For ease of understanding, dashed lines in the figures represent the open/close state and the motion state of the first barrier gate crossbar at historical moments. Solid lines in the figures represent the open/close state and the motion state of the first barrier gate crossbar at a current moment.

Figure 13A:
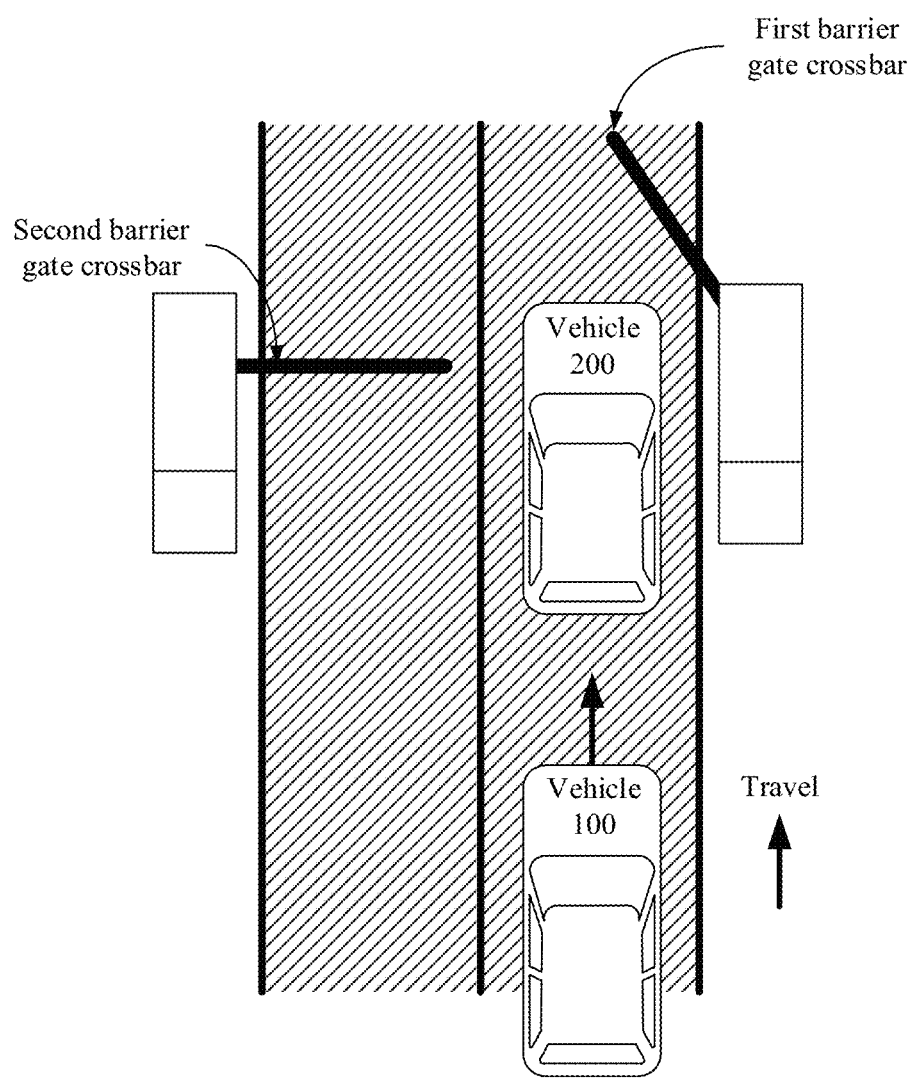
FIG. 13($a$) to FIG. 15($d$) are schematic diagrams of passing through a first barrier gate crossbar by a vehicle according to an embodiment of this application.
Figure 13B:
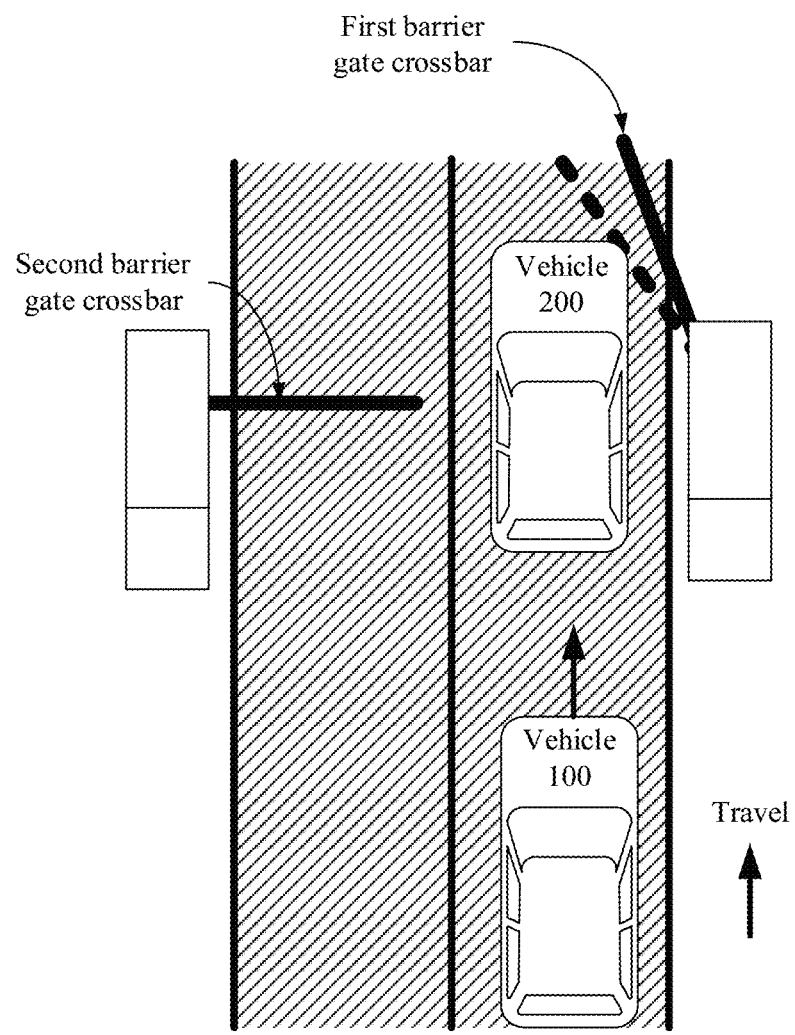

FIG. 13(a) and FIG. 13(b) show a process in which the first barrier gate crossbar rises slowly, and a vehicle 200 in front of the vehicle 100 passes through the first barrier gate crossbar. In this case, the open/close state of the first barrier gate crossbar is open, and the motion state of the first barrier gate crossbar is ascending. The vehicle 100 obtains the data that are of the first barrier gate crossbar and the second barrier gate crossbar and that are collected by the one or more sensors, determines the data of the target barrier gate crossbar, namely, the data of the first barrier gate crossbar, from the data of the first barrier gate crossbar and the data of the second barrier gate crossbar based on the pose of the first barrier gate crossbar, and determines, based on the data of the first barrier gate crossbar, that the open/close state of the first barrier gate crossbar is open and the motion state of the first barrier gate crossbar is ascending, and controls the vehicle 100 to travel.

Figure 13C:
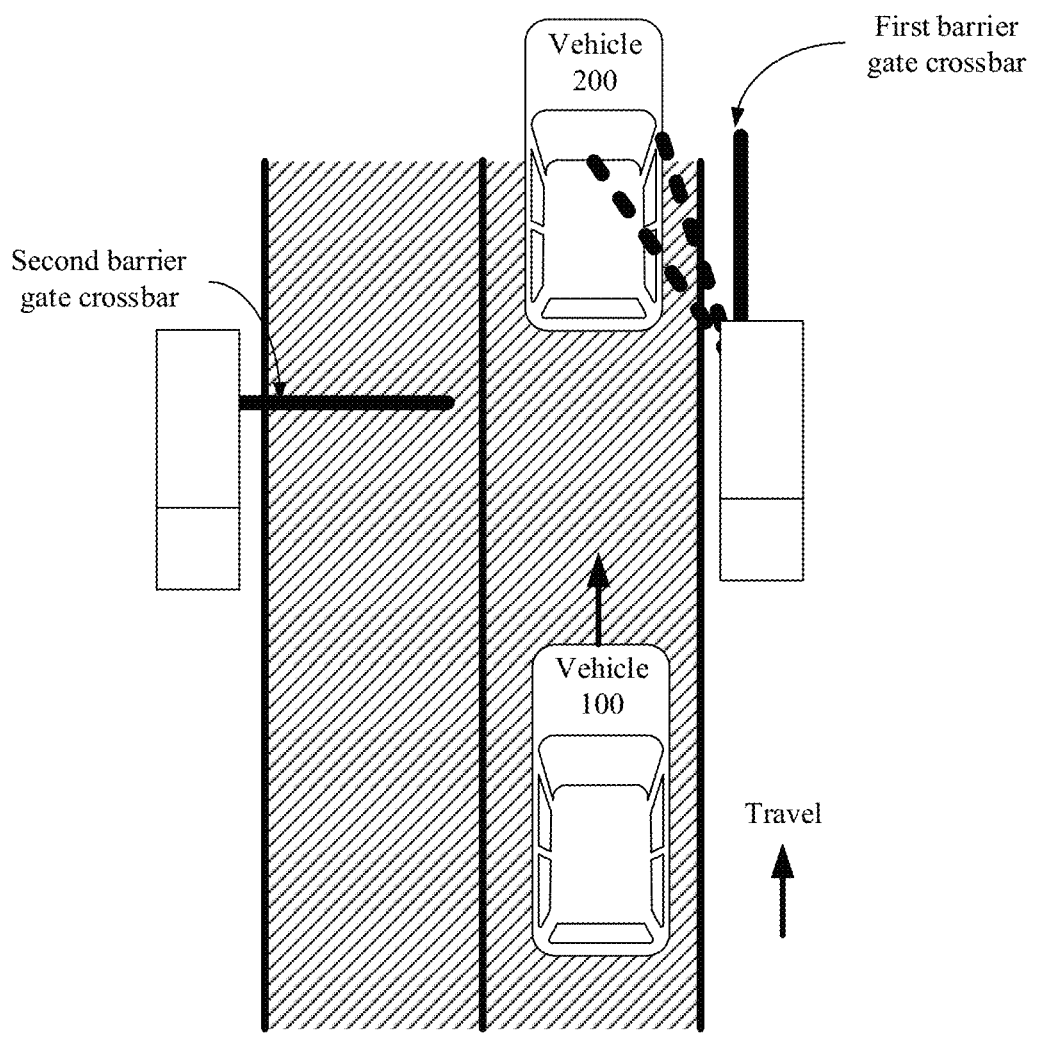

As shown in FIG. 13(c), the first barrier gate crossbar is perpendicular to the ground, and is in a completely open state. In this case, the vehicle 100 obtains the data that is of the first barrier gate crossbar and that is collected by the one or more sensors, and determines that the open/close state of the first barrier gate crossbar is open and the motion state of the first barrier gate crossbar is static, and controls the vehicle 100 to travel.

Figure 13D:
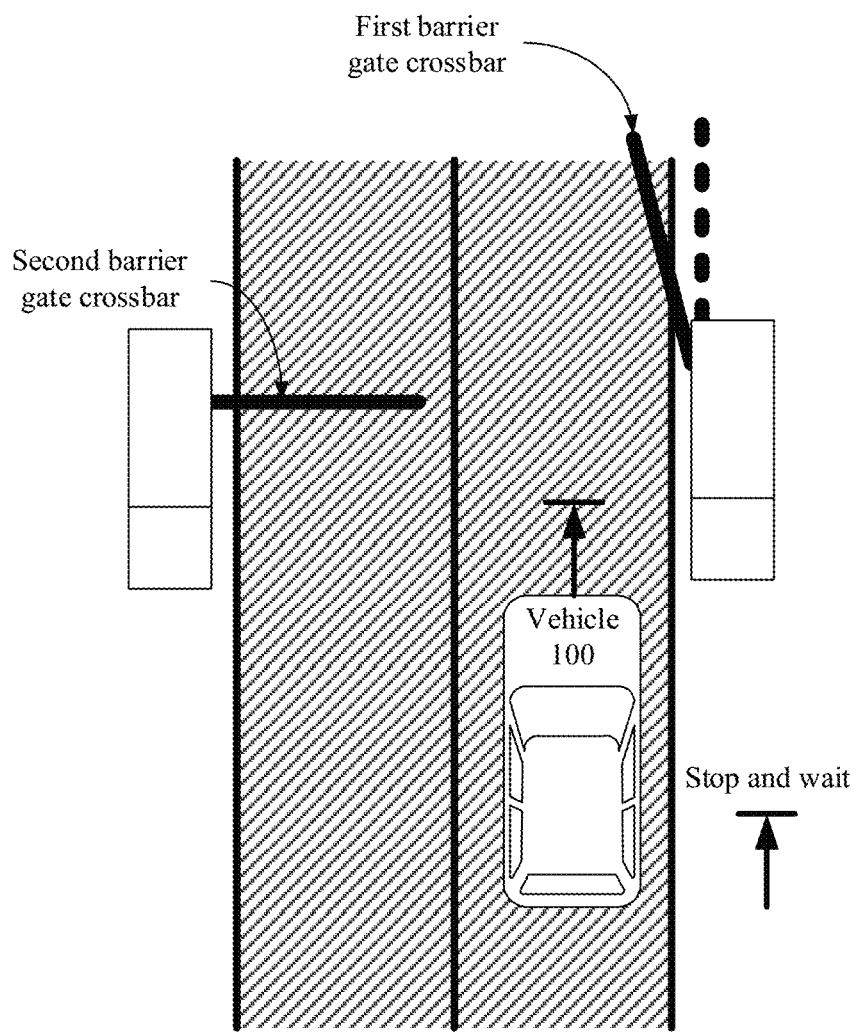

As shown in FIG. 13(d), the vehicle 200 has passed through the first barrier gate crossbar, and the first barrier gate crossbar starts to descend. The vehicle 100 obtains the data that is of the first barrier gate crossbar and that is collected by the one or more sensors, determines, based on the data of the first barrier gate crossbar, that the open/close state of the first barrier gate crossbar is open and the motion state of the first barrier gate crossbar is descending, and controls the vehicle 100 to stop and wait.

Figure 14A:
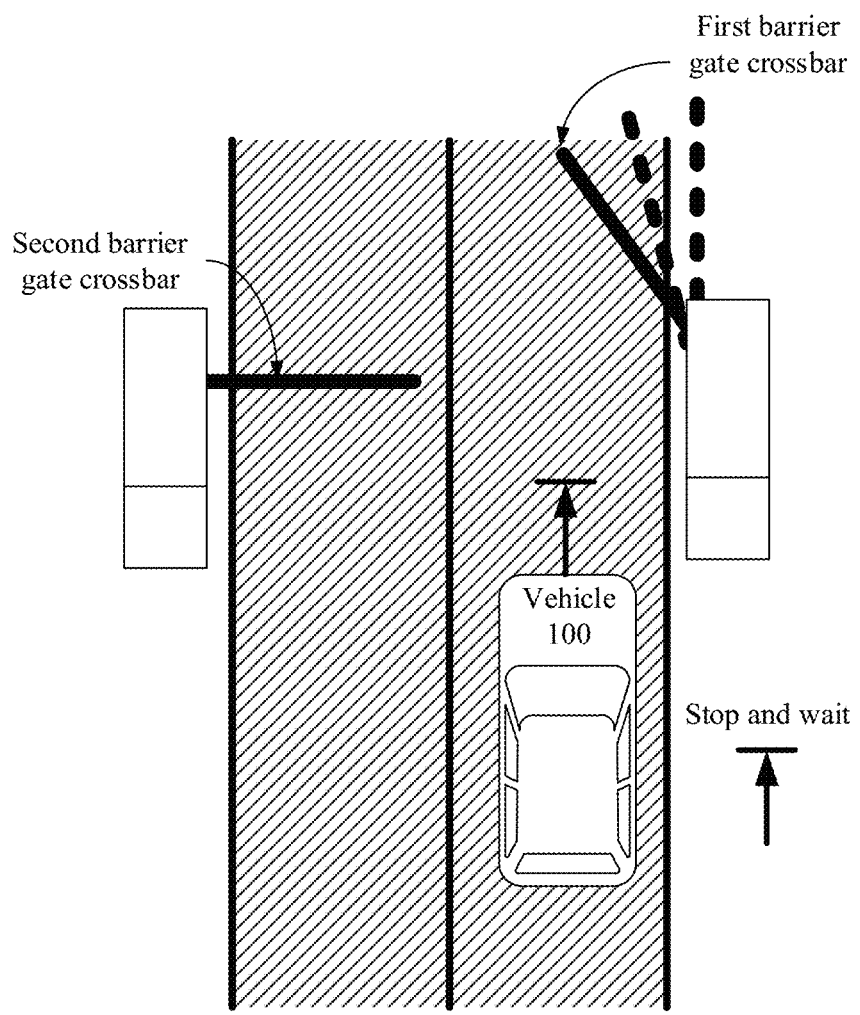

As shown in FIG. 14(a), the first barrier gate crossbar continuously descends. The vehicle 100 obtains the data that is of the first barrier gate crossbar and that is collected by the one or more sensors. In this case, the angle of the first barrier gate crossbar is less than or equal to the first preset angle, and the angle of the first barrier gate crossbar is greater than or equal to the second preset angle, and the vehicle 100 may determine the open/close state and the motion state of the first barrier gate crossbar based on an angle of the first barrier gate crossbar at a previous moment. For example, the open/close state and the motion state of the first barrier gate crossbar are determined based on the angle of the first barrier gate crossbar shown in FIG. 13(d). To be specific, the open/close state of the first barrier gate crossbar is open and the motion state of the first barrier gate crossbar is descending. The vehicle 100 is controlled to stop and wait.

Figure 14B:
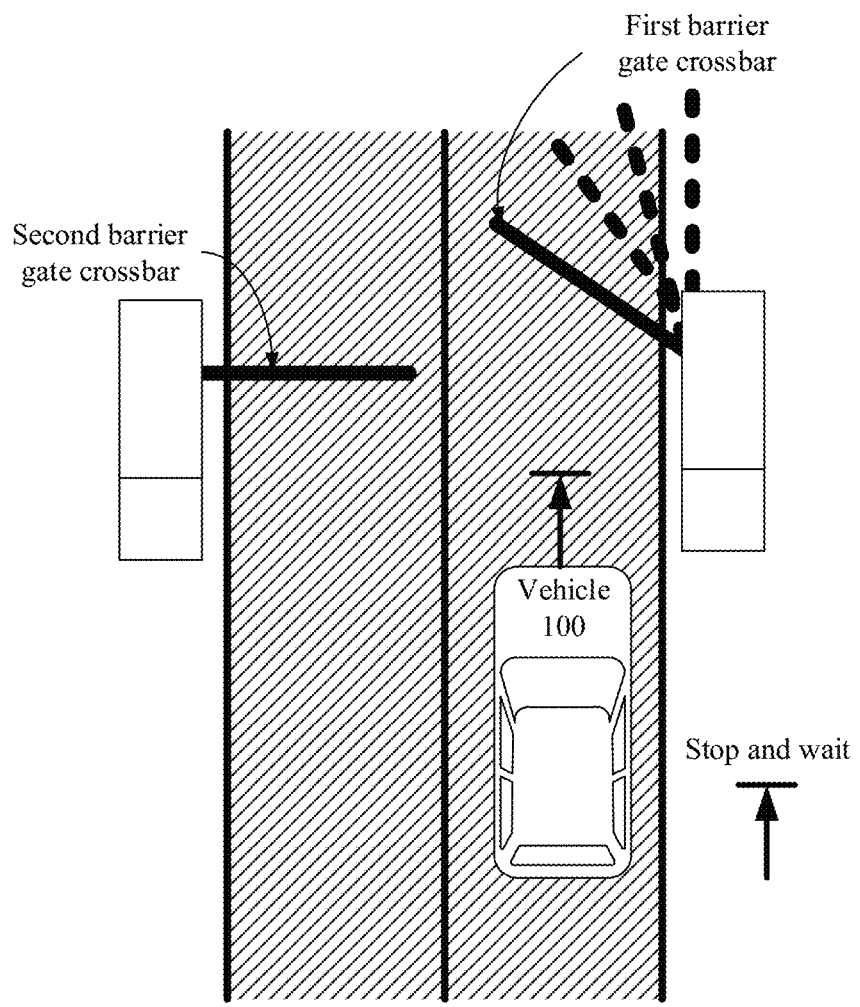

As shown in FIG. 14(b), the first barrier gate crossbar continuously descends. The vehicle 100 obtains the data that is of the first barrier gate crossbar and that is collected by the one or more sensors, determines, based on the data of the first barrier gate crossbar, that the open/close state of the first barrier gate crossbar is close and the motion state of the first barrier gate crossbar is descending, and controls the vehicle 100 to stop and wait.

Figure 14C:
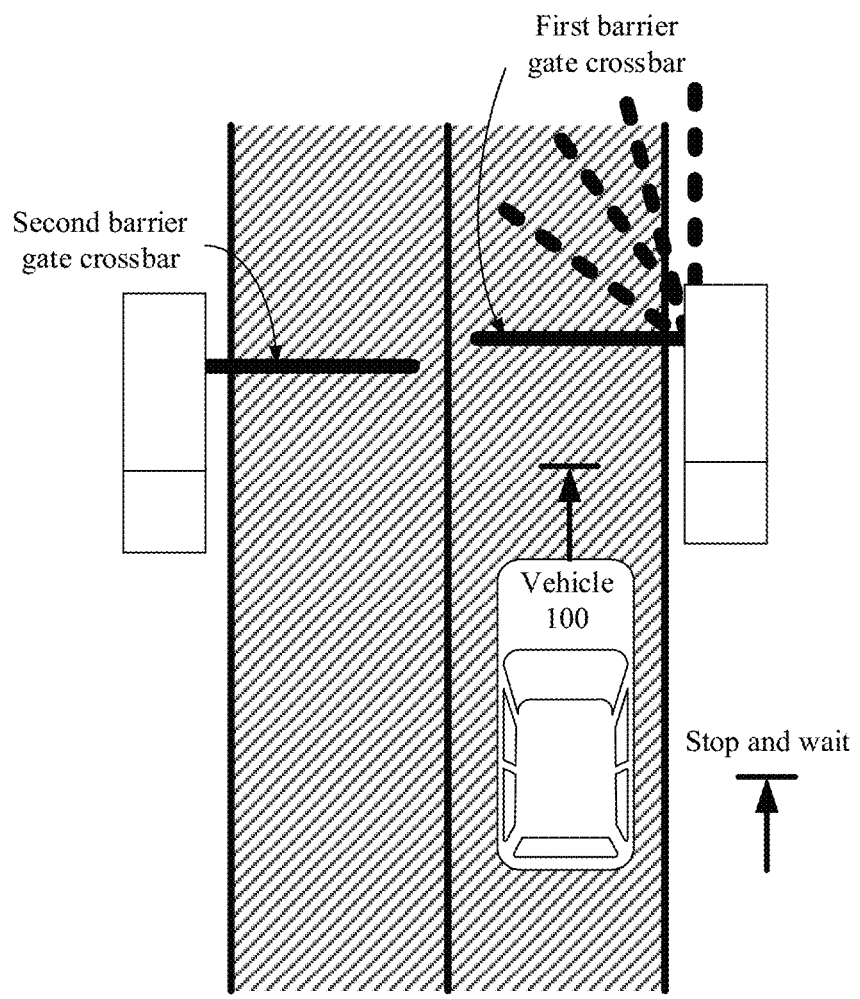

As shown in FIG. 14(c), the first barrier gate crossbar is parallel to the ground, and is in a completely close state. In this case, the open/close state of the first barrier gate crossbar is close and the motion state of the first barrier gate crossbar is static. The vehicle 100 is controlled to stop and wait.

Figure 14D:
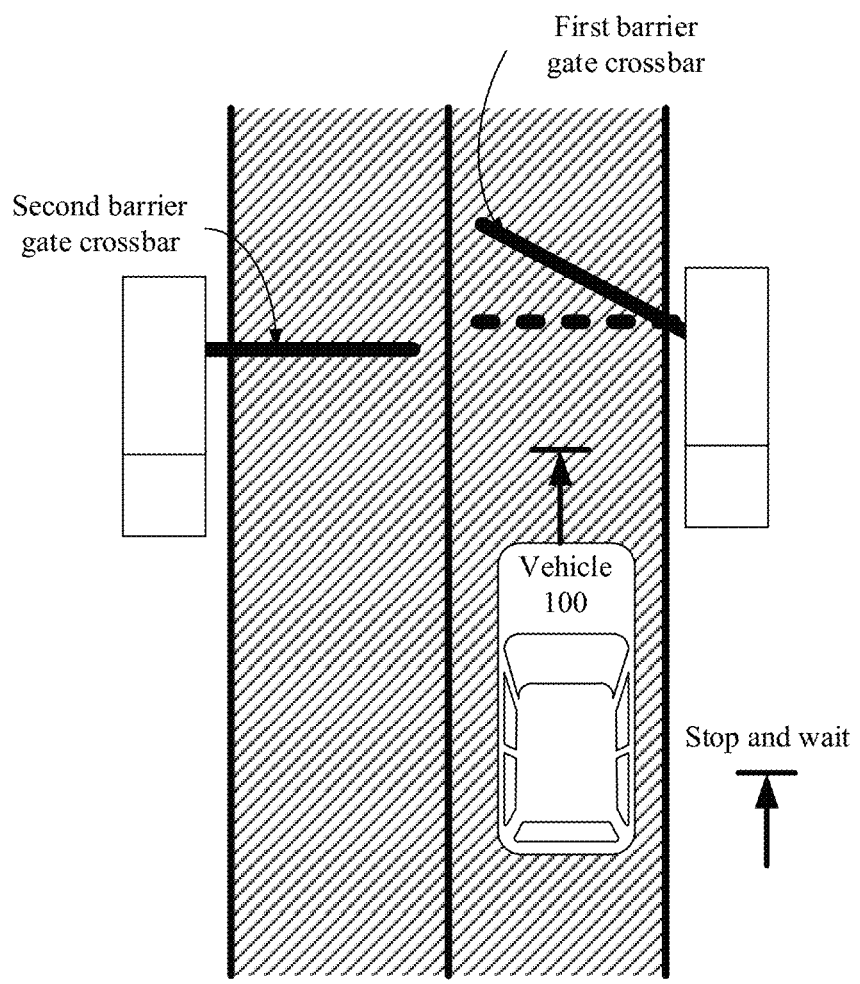

As shown in FIG. 14(d), the first barrier gate crossbar starts to ascend. The vehicle 100 obtains the data that is of the first barrier gate crossbar and that is collected by the one or more sensors, determines, based on the data of the first barrier gate crossbar, that the open/close state of the first barrier gate crossbar is close and the motion state of the first barrier gate crossbar is ascending, and controls the vehicle 100 to stop and wait.

Figure 15A:
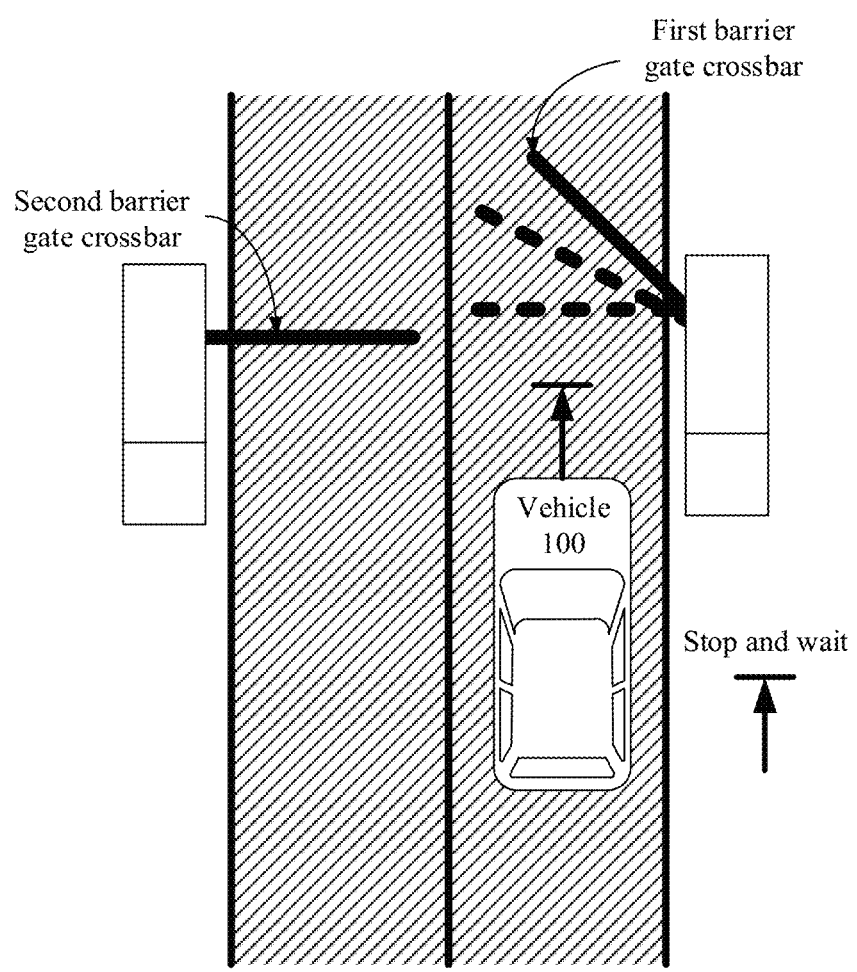

As shown in FIG. 15(a), the first barrier gate crossbar continuously ascends. The vehicle 100 obtains the data that is of the first barrier gate crossbar and that is collected by the one or more sensors. In this case, the angle of the first barrier gate crossbar is less than or equal to the first preset angle, and the angle of the first barrier gate crossbar is greater than or equal to the second preset angle, and the vehicle 100 may determine the open/close state and the motion state of the first barrier gate crossbar based on the angle of the first barrier gate crossbar at a previous moment. For example, the open/close state and the motion state of the first barrier gate crossbar are determined based on the angle of the first barrier gate crossbar shown in FIG. 14(d). To be specific, the open/close state of the first barrier gate crossbar is close and the motion state of the first barrier gate crossbar is ascending. The vehicle 100 is controlled to stop and wait.

Figure 15B:
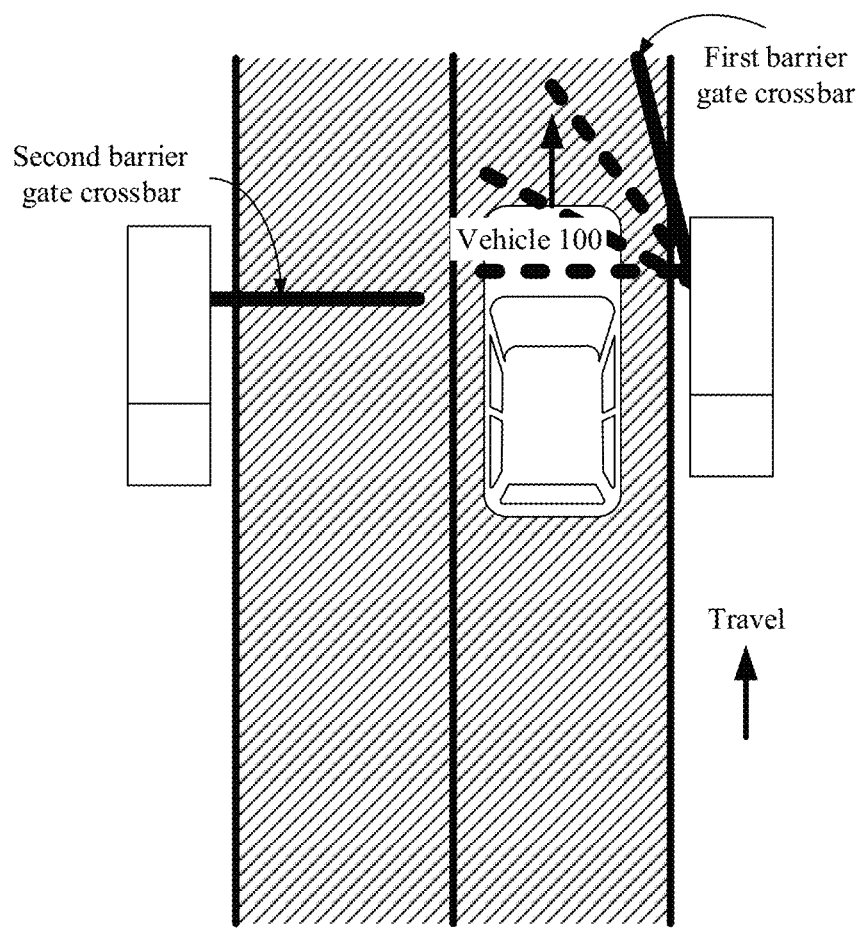
Figure 15C:
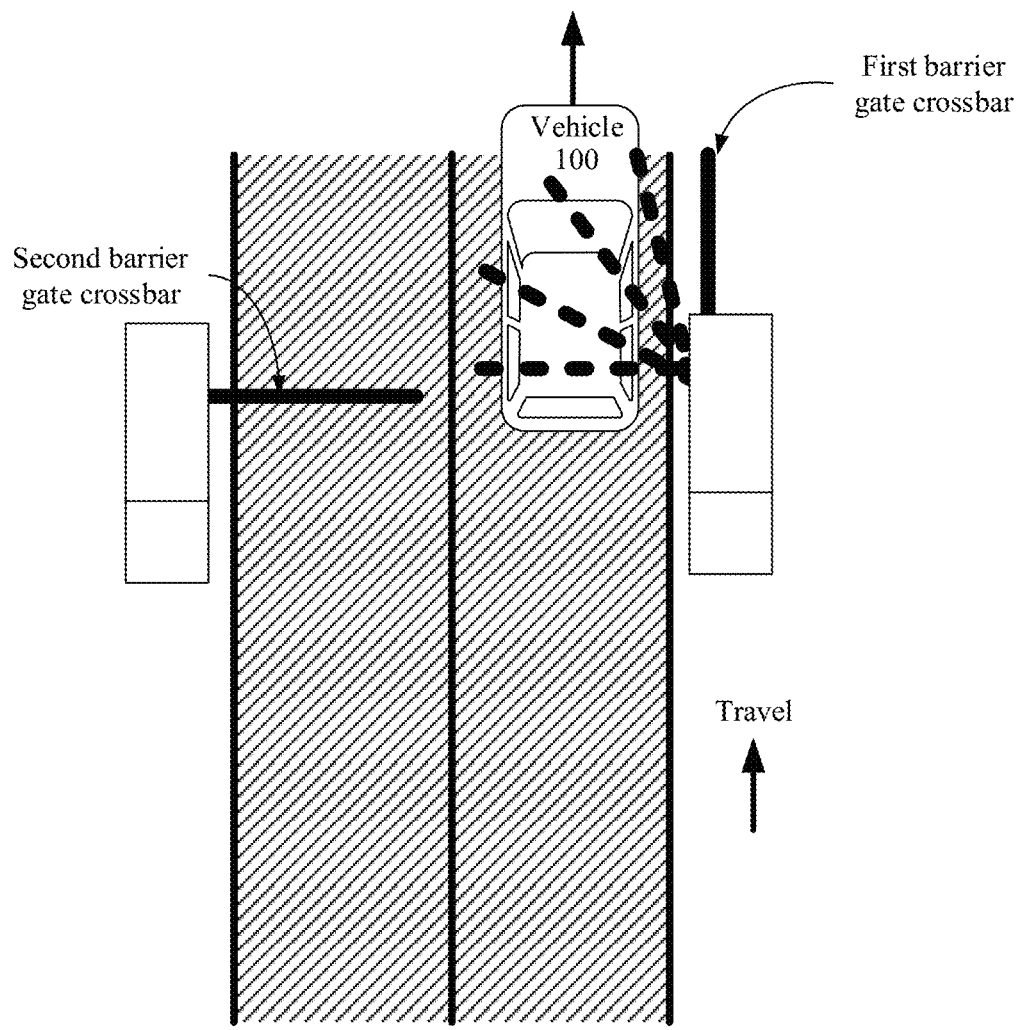

As shown in FIG. 15(b) and FIG. 15(c), the first barrier gate crossbar continuously ascends. The vehicle 100 obtains the data that is of the first barrier gate crossbar and that is collected by the one or more sensors, determines, based on the data of the first barrier gate crossbar, that the open/close state of the first barrier gate crossbar is open and the motion state of the first barrier gate crossbar is ascending, and controls the vehicle 100 to travel.

In some embodiments, when the vehicle 100 is in a traveling process, a head of the vehicle is excessively close to the first barrier gate crossbar, the first barrier gate crossbar is not in a field of view (field of view, FoV) range of the sensor, and the sensor cannot obtain the data of the first barrier gate crossbar. Therefore, the vehicle 100 may determine the open/close state and the motion state of the first barrier gate crossbar by using the data of the first barrier gate crossbar of historical frames. In this scenario, because the first barrier gate crossbar continuously ascends, the vehicle 100 determines, based on the data of the first barrier gate crossbar of the historical frames, that the open/close state of the first barrier gate crossbar is open and the motion state of the first barrier gate crossbar is ascending, and controls the vehicle 100 to slowly pass through the first barrier gate crossbar.

Figure 15D:
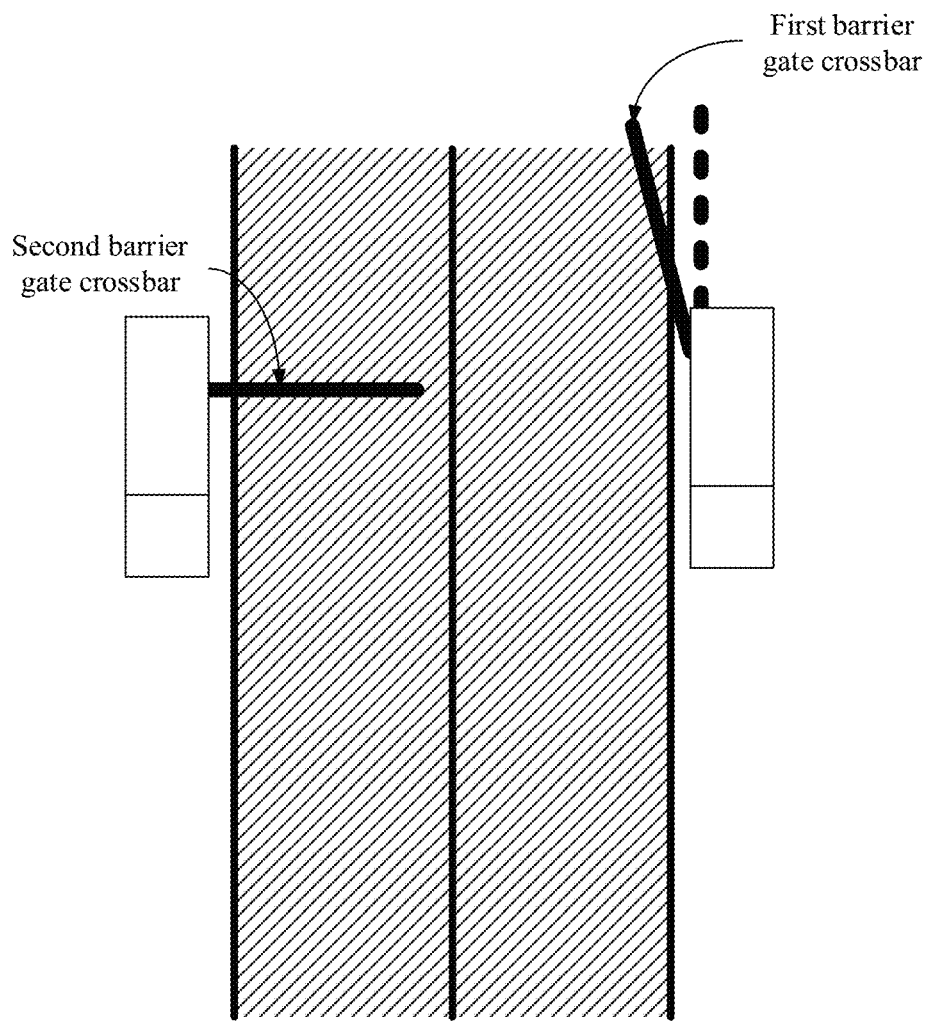

As shown in FIG. 15(d), the vehicle 200 has passed through the first barrier gate crossbar, and the first barrier gate crossbar starts to descend.

It should be noted that, a method for recognizing a vehicle by a barrier gate crossbar is not limited in this application. Refer to the prior art for details.

It may be understood that, to implement functions in the foregoing embodiments, the vehicle includes corresponding hardware structures and/or software modules for performing the functions. A person skilled in the art should easily be aware that, in combination with the examples described in the embodiments disclosed in this application, units, method operations may be implemented by hardware or a combination of hardware and computer software. Whether a function is performed by hardware or hardware driven by computer software depends on particular application scenarios and design constraints of the technical solutions.

Figure 16:
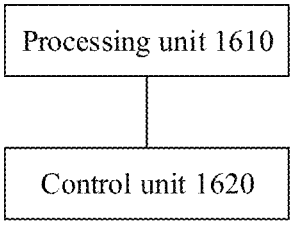
FIG. 16 is a schematic diagram of composition of an apparatus for passing through a barrier gate crossbar by a vehicle according to an embodiment of this application.

FIG. 16 is a schematic structural diagram of a possible apparatus for passing through a barrier gate crossbar by a vehicle according to an embodiment of this application. These apparatuses for passing through a barrier gate crossbar by a vehicle may be configured to implement functions of the processor in the foregoing method embodiments, and therefore beneficial effects of the foregoing method embodiments can also be achieved. In this embodiment of this application, the apparatus for passing through a barrier gate crossbar by a vehicle may be the processor 113 shown in FIG. 1.

As shown in FIG. 16, the apparatus 1600 for passing through a barrier gate crossbar by a vehicle includes a processing unit 1610 and a control unit 1620. The apparatus 1600 for passing through a barrier gate crossbar by a vehicle is configured to implement the functions of the processor in the method embodiment shown in FIG. 4, FIG. 6, or FIG. 8.

When the apparatus 1600 for passing through a barrier gate crossbar by a vehicle is configured to implement the functions of the processor in the method embodiment shown in FIG. 4, the processing unit 1610 is configured to perform S402 and S403, and the control unit 1620 is configured to perform S404.

When the apparatus 1600 for passing through a barrier gate crossbar by a vehicle is configured to implement the functions of the processor in the method embodiment shown in FIG. 6, the processing unit 1610 is configured to perform S602 to S606, and the control unit 1620 is configured to perform S607.

When the apparatus 1600 for passing through a barrier gate crossbar by a vehicle is configured to implement the functions of the processor in the method embodiment shown in FIG. 8, the processing unit 1610 is configured to perform S602 to S606, and the control unit 1620 is configured to perform S607.

For more detailed descriptions of the processing unit 1610 and the control unit 1620, directly refer to related descriptions in the method embodiment shown in FIG. 4, FIG. 6, or FIG. 8, and details are not described herein.

It should be noted that the processor in the embodiments of this application may be a central processing unit (CPU), may be another general-purpose processor, a digital signal processor (DSP), an application-specific integrated circuit (ASIC), a field programmable gate array (FPGA), or another programmable logical device, a transistor logical device, a hardware component, or any combination thereof. The general-purpose processor may be a microprocessor or any conventional processor.

The method operations in the embodiments of this application may be implemented by hardware, or may be implemented by a processor executing a software instruction. The software instruction may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network device or a terminal device. Certainly, the processor and the storage medium may exist in the network device or the terminal device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or instructions are loaded and executed on the computer, the procedure or functions described in the embodiments of this application are all or partially performed. The computer may be a general-purpose computer, a dedicated computer, a computer network, a network device, user equipment, or another programmable apparatus. The computer programs or instructions may be stored in a computer-readable storage medium or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by a computer, or a data storage device, for example, a server or data center integrating one or more usable media. The usable medium may be a magnetic medium, for example, a floppy disk, a hard disk, or a magnetic tape, or may be an optical medium, for example, a digital video disc (DVD), or may be a semiconductor medium, for example, a solid state drive (SSD).

In the embodiments of this application, if there is no special description or logical conflict, and terms and/or descriptions in different embodiments are consistent and may be mutually referenced, technical features in the different embodiments may be combined to form a new embodiment based on an internal logical relationship.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. In the text description of this application, the character "/" generally indicates that associated objects are in an "or" relationship. In the formula of this application, the character "/" indicates that the associated objects are in a "division" relationship.

It may be understood that various numeric numbers in the embodiments of this application are merely distinguishing for ease of description, and are not intended to limit the scope of the embodiments of this application. Sequence numbers of the foregoing processes do not mean execution sequences. The execution sequences of the processes should be determined based on functions and internal logic of the processes.

What is claimed is:

1. A method for passing through a barrier gate crossbar by an autonomous driving vehicle, comprising:
   obtaining data of a plurality of barrier gate crossbars collected by one or more sensors;
   determining information of a target barrier gate crossbar of the plurality of barrier gate crossbars from the data of the plurality of barrier gate crossbars based on a pose of the target barrier gate crossbar, the pose including a position and an orientation of the target barrier gate crossbar, wherein the target barrier gate crossbar is a barrier gate crossbar of a lane on which the autonomous driving vehicle is located;
   determining a status of the target barrier gate crossbar based on the information of the target barrier gate crossbar, the status of the target barrier gate crossbar comprising one of an open state or a close state, wherein the status of the target barrier gate crossbar further comprises a motion state comprising an ascending state, a descending state, or a static state; and
   controlling, based on the status of the target barrier gate crossbar, the autonomous driving vehicle to pass through the target barrier gate crossbar, comprising:
      controlling the autonomous driving vehicle to pass through the target barrier gate crossbar, when the one of the open state or the close state of the target barrier gate crossbar is the open state, and the motion state of the target barrier gate crossbar is the ascending state or the static state.

2. The method according to claim 1,
   wherein the controlling, based on the status of the target barrier gate crossbar, the autonomous driving vehicle to pass through the target barrier gate crossbar comprises:
   controlling, based on the one of the open state or the close state of the target barrier gate crossbar, the autonomous driving vehicle to pass through the target barrier gate crossbar.

3. The method according to claim 2, wherein the controlling, based on the one of the open state or the close state of the target barrier gate crossbar, the autonomous driving vehicle to pass through the target barrier gate crossbar comprises:
  when the one of the open state or the close state of the target barrier gate crossbar is the open state, controlling the autonomous driving vehicle to travel; and
  when the one of the open state or the close state of the target barrier gate crossbar is the close state, controlling the autonomous driving vehicle to stop.

4. The method according to claim 1, wherein the controlling, based on the one of the open state or the close state and the motion state of the target barrier gate crossbar, the autonomous driving vehicle to pass through the target barrier gate crossbar comprises:
  when the one of the open state or the close state of the target barrier gate crossbar is the open state, and the motion state of the target barrier gate crossbar is the descending state, controlling the autonomous driving vehicle to stop.

5. The method according to claim 1, wherein the controlling, based on the one of the open state or the close state and the motion state of the target barrier gate crossbar, the autonomous driving vehicle to pass through the target barrier gate crossbar comprises:
  when the one of the open state or the close state of the target barrier gate crossbar is the close state, and the motion state of the target barrier gate crossbar is the descending state, the static state, or the ascending state, controlling the autonomous driving vehicle to stop.

6. The method according to claim 1, wherein the determining the status of the target barrier gate crossbar based on the data of the target barrier gate crossbar comprises:
  determining an angle of the target barrier gate crossbar based on the data of the target barrier gate crossbar, wherein the angle of the target barrier gate crossbar is an included angle between the target barrier gate crossbar and a reference straight line; and
  determining the one of the open state or the close state and the motion state of the target barrier gate crossbar based on the angle of the target barrier gate crossbar.

7. The method according to claim 6, wherein the determining the one of the open state or the close state of the target barrier gate crossbar and the motion state of the target barrier gate crossbar based on the angle of the target barrier gate crossbar comprises:
  when the angle of the target barrier gate crossbar is greater than a first preset angle, determining that the one of the open state or the close state of the target barrier gate crossbar is the open state;
  when the angle of the target barrier gate crossbar is less than a second preset angle, determining that the one of the open state or the close state of the target barrier gate crossbar is the close state, wherein the second preset angle is less than the first preset angle; and
  when the angle of the target barrier gate crossbar is less than or equal to the first preset angle and greater than or equal to the second preset angle, determining that the one of the open state or the close state of the target barrier gate crossbar is an open state or close state of the target barrier gate crossbar determined at an immediate previous moment when a last determination was made.

8. The method according to claim 6, wherein the determining the one of the open state or the close state and the motion state of the target barrier gate crossbar based on the angle of the target barrier gate crossbar comprises:
  when an $i^{th}$ angle of the target barrier gate crossbar is greater than an $(i-1)^{th}$ angle of the target barrier gate crossbar, determining that the motion state of the target barrier gate crossbar is ascending; and
  when the $i^{th}$ angle of the target barrier gate crossbar is less than the $(i-1)^{th}$ angle of the target barrier gate crossbar, determining that the motion state of the target barrier gate crossbar is descending, wherein
  the $i^{th}$ angle of the target barrier gate crossbar is determined based on the target barrier gate crossbar in an $i^{th}$ frame of image, the $(i-1)^{th}$ angle of the target barrier gate crossbar is determined based on the target barrier gate crossbar in an $(i-1)^{th}$ frame of image, and the $i^{th}$ frame of image is adjacent to the $(i-1)^{th}$ frame of image.

9. An apparatus for passing through a barrier gate crossbar by an autonomous driving vehicle, comprising:
  at least one processor; and
  a memory coupled to the at least one processor and storing programming instructions, which when executed by the at least one processor, cause the at least one processor to:
    obtain data of a plurality of barrier gate crossbars collected by one or more sensors,
    determine information of a target barrier gate crossbar of the plurality of barrier gate crossbars from the data of the plurality of barrier gate crossbars based on a pose of the target barrier gate crossbar, the pose including a position and an orientation of the target barrier gate crossbar, wherein the target barrier gate crossbar is a barrier gate crossbar of a lane on which the autonomous driving vehicle is located, and
    determine a status of the target barrier gate crossbar based on the information of the target barrier gate crossbar, the status of the target barrier gate crossbar comprising one of an open state or a close state, wherein the status of the target barrier gate crossbar further comprises a motion state comprising an ascending state, a descending state, or a static state; and
  control, based on the status of the target barrier gate crossbar, the autonomous driving vehicle to pass through the target barrier gate crossbar, wherein the at least one processor is caused to:
    control the autonomous driving vehicle to pass through the target barrier gate crossbar, when the one of the open state or the close state of the target barrier gate crossbar is the open state, and the motion state of the target barrier gate crossbar is the ascending state or the static state.

10. The apparatus according to claim 9, wherein the at least one processor storing programming instructions, which when executed by the at least one processor further cause the at least one processor to:
  control, based on the one of the open state or the close state of the target barrier gate crossbar, the autonomous driving vehicle to pass through the target barrier gate crossbar.

11. The apparatus according to claim 10, wherein the at least one processor storing programming instructions, which when executed by the at least one processor further cause the at least one processor to:
  when the one of the open state or the close state of the target barrier gate crossbar is the open state, control the autonomous driving vehicle to travel; and when the one of the open state or the close state of the target barrier gate crossbar is the close state, controlling the autonomous driving vehicle to stop.

12. The apparatus according to claim 9, wherein the at least one processor storing programming instructions, which when executed by the at least one processor further cause the at least one processor to:
when the one of the open state or the close state of the target barrier gate crossbar is the open state, and the motion state of the target barrier gate crossbar is the descending state, control the autonomous driving vehicle to stop.

13. The apparatus according to claim 12, wherein the at least one processor storing programming instructions, which when executed by the at least one processor further cause the at least one processor to:
when the one of the open state or the close state of the target barrier gate crossbar is the close state, and the motion state of the target barrier gate crossbar is the descending state, the static state, or the ascending state, control the autonomous driving vehicle to stop.

14. The apparatus according to claim 13, wherein the at least one processor storing programming instructions, which when executed by the at least one processor further cause the at least one processor to:
determine an angle of the target barrier gate crossbar based on the data of the target barrier gate crossbar, wherein the angle of the target barrier gate crossbar is an included angle between the target barrier gate crossbar and a reference straight line; and
determining the one of the open state or the close state and the motion state of the target barrier gate crossbar based on the angle of the target barrier gate crossbar.

15. The apparatus according to claim 14, wherein the at least one processor storing programming instructions, which when executed by the at least one processor further cause the at least one processor to:
when the angle of the target barrier gate crossbar is greater than a first preset angle, determining that the one of the open state or the close state of the target barrier gate crossbar is the open state;
when the angle of the target barrier gate crossbar is less than a second preset angle, determining that the one of the open state or the close state of the target barrier gate crossbar is the close state, wherein the second preset angle is less than the first preset angle; and
when the angle of the target barrier gate crossbar is less than or equal to the first preset angle and greater than or equal to the second preset angle, determining that the one of the open state or the close state of the target barrier gate crossbar is an open state or a close state of the target barrier gate crossbar determined at an immediate previous moment when a last determination was made.

16. A computer program product comprising computer-executable instructions stored on a non-transitory computer-readable storage medium which, when executed by a processor, cause an apparatus to:
obtain data of a plurality of barrier gate crossbars collected by one or more sensors;
determine information of a target barrier gate crossbar of the plurality of barrier gate crossbars from the data of the plurality of barrier gate crossbars based on a pose of the target barrier gate crossbar, the pose including a position and an orientation of the target barrier gate crossbar, wherein the target barrier gate crossbar is a barrier gate crossbar of a lane on which an autonomous driving vehicle is located;
determine a status of the target barrier gate crossbar based on the information of the target barrier gate crossbar, the status of the target barrier gate crossbar comprising one of an open state or a close state, wherein the status of the target barrier gate crossbar further comprises a motion state comprising an ascending state, a descending state, or a static state; and
control, based on the status of the target barrier gate crossbar, the autonomous driving vehicle to pass through the target barrier gate crossbar, wherein the apparatus is caused to:
control the autonomous driving vehicle to pass through the target barrier gate crossbar, when the one of the open state or the close state of the target barrier gate crossbar is the open state, and the motion state of the target barrier gate crossbar is the ascending state or the static state.

17. The computer program product according to claim 16, wherein the computer-executable instructions stored on the non-transitory computer-readable storage medium which, when executed by the processor, further cause the apparatus to:
control, based on the one of the open state or the close state of the target barrier gate crossbar, the autonomous driving vehicle to pass through the target barrier gate crossbar.

18. The computer program product according to claim 17, wherein the computer-executable instructions stored on the non-transitory computer-readable storage medium which, when executed by the processor, further cause the apparatus to:
when the one of the open state or the close state of the target barrier gate crossbar is the open state, control the autonomous driving vehicle to travel; and
when the one of the open state or the close state of the target barrier gate crossbar is the close state, controlling the autonomous driving vehicle to stop.

19. The computer program product according to claim 16, wherein the computer-executable instructions stored on the non-transitory computer-readable storage medium which, when executed by the processor, further cause the apparatus to:
when the one of the open state or the close state of the target barrier gate crossbar is the open state, and the motion state of the target barrier gate crossbar is the descending state, control the autonomous driving vehicle to stop.

20. The computer program product according to claim 19, wherein the computer-executable instructions stored on the non-transitory computer-readable storage medium which, when executed by the processor, further cause the apparatus to:
when the one of the open state or the close state of the target barrier gate crossbar is the close state, and the motion state of the target barrier gate crossbar is the descending state, the static state, or the ascending state, control the autonomous driving vehicle to stop.

* * * * *